(12) United States Patent
Younessian

(10) Patent No.: US 12,439,123 B2
(45) Date of Patent: Oct. 7, 2025

(54) AUGMENTING CONTENT USING CONTEXTUAL FEATURES

(71) Applicant: Comcast Cable Communications, LLC, Philadelphia, PA (US)

(72) Inventor: Ehsan Younessian, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/157,325

(22) Filed: Jan. 20, 2023

(65) Prior Publication Data

US 2024/0251134 A1    Jul. 25, 2024

(51) Int. Cl.
*H04N 21/466* (2011.01)
*H04N 21/24* (2011.01)
*H04N 21/254* (2011.01)

(52) U.S. Cl.
CPC ..... *H04N 21/4667* (2013.01); *H04N 21/2407* (2013.01); *H04N 21/2541* (2013.01)

(58) Field of Classification Search
CPC ........... H04N 21/4667; H04N 21/2407; H04N 21/2541
See application file for complete search history.

(56) References Cited

U.S. PATENT DOCUMENTS

| | | | |
|---|---|---|---|
| 7,983,442 B2 | 7/2011 | Chiang et al. | |
| 8,068,719 B2 | 11/2011 | Chen | |
| 8,196,164 B1 | 6/2012 | Oztaskent et al. | |
| 10,575,033 B2 | 2/2020 | Smith | |
| 2008/0295129 A1 | 11/2008 | Laut | |
| 2013/0005471 A1* | 1/2013 | Chung | A63F 13/86 |
| | | | 463/42 |
| 2013/0185749 A1 | 7/2013 | Bill | |
| 2015/0026718 A1* | 1/2015 | Seyller | H04N 21/854 |
| | | | 725/34 |
| 2016/0212455 A1* | 7/2016 | Manna | G06Q 30/02 |
| 2018/0218400 A1* | 8/2018 | Kerns | G06Q 30/0256 |
| 2022/0398823 A1* | 12/2022 | El-Sana | G06V 10/25 |

* cited by examiner

*Primary Examiner* — Oschta I Montoya
(74) *Attorney, Agent, or Firm* — Banner & Witcoff, Ltd.

(57) ABSTRACT

Systems, apparatuses, and methods are described for contextually augmenting content, which may be offered based on segment types associated with various sentiments, emotions, and/or excitement levels which may be detected and/or aligned in the content. The contextual content augmentation may comprise in-video contextual advertising, which may be based on advertisement strategies such as segment-based, alignment/detection-based, market-based, and/or user-based strategies.

24 Claims, 24 Drawing Sheets

| Content Type | Exciting segments | Negative segments | Idle segments | Happy segments | Angry segments | Other segments |
|---|---|---|---|---|---|---|
| Soccer | Goal; Shot on target; Keeper saved; Keeper punch | Foul; Injury; Yellow card; Red card; Challenge; Missed shot | Substitution; Team set up | Underdog player scores key goal | Unfair call by referee | Patriotic segments: national anthem |
| Formula 1 | Lap completion; Overtake | Crash | Pit stop; Before race start; After race end | Racer waves to family | Racers pushing each other off track | Patriotic segments: national anthem |
| Talking Heads | Spirited debate | Aggressive argument | Waiting for guest | Fan giveaway | Insulting guest; Angry guest | Scary segments: scary news |
| Cooking | Food completed; positive taste-test, contestant wins | Food ruined; negative taste-test; contestant loses | Waiting for food to cook; Listing ingredients | Underdog wins | Contestant cheats | Suspenseful segments: time running out |
| Home Improvement | Renovation complete | Renovation over budget | Renovation montage | Renovation gifted | Contestant rude about design choices | Funny segments: host joking with contestant |

FIG. 7

| Action | When to show | What to show | Where to show |
|---|---|---|---|
| Highlight an existing advertisement | Exciting segments happy segments, etc. | Logo from detected advertisements; Brand from detected advertisements | A detected low-activity region |
| Replace an existing advertisement | Idle segments, negative segments, angry segments, etc. | New logo from external sources; New brand from external sources | Space of existing brand |
| Add existing advertisement to new region | Idle segments, boring segments, etc. | Logo from detected advertisements; Brand from detected advertisements | Pre-defined location |
| Change logo of an existing brand | Exciting segments, negative segments, market-based event, user-based event, etc. | Logo from detected advertisements; Brand from detected advertisements; New logo from external sources; New brand from external sources | Space of existing brand |
| Other actions | Emotional segment, strategy-based segment, etc. | New logo associated with emotional segment; New brand associated with emotional segment | A detected low-activity region; Pre-defined location |

FIG. 8

Select By Venue

| Baseball Stadium Team A Home | Soccer Stadium Team B Home | Golf Course | Tennis Court |

Select Event | Select Season — 901

Available Events: — 902

| Event 902A | Team(s) 902B | Options 902C |
|---|---|---|
| League Final Match | Semi-Finals 1 Winner vs. Semi-Finals 2 Winner | Select placement |
| Tournament Semi-Finals Match 2 | Team A vs. Team D | Select placement |
| Tournament Semi-Finals Match 1 | Team G vs. Team H | Select placement |
| Artist ABC Concert | Artist ABC | Select placement |

Portal 602

1000
Portal 602
Select advertisement strategy type:
- ● Segment-based 1001
- ○ Alignment/Detection-based 1002
- ○ Market-based 1003
- ○ User-based 1004
 Select content type 1005
 Select segment type 1006
Enter brand name 1007 [                    ]
Import logo 1008  
FIG. 10

1100

Portal 602

Select advertisement strategy type:

○ Segment-based 1001
● Alignment/Detection-based 1002
○ Market-based 1003
○ User-based 1004

▨ Select content type 1005
▨ Select segment type 1006
▨ Select scene 1101
▨ Select region 1102
▨ Select brand 1103

Enter brand name 1007 [_____]

Import logo 1008   

Select advertisement action type:

○ Highlight selected brand 1104        ○ Add selected brand to selected region 1106
○ Replace selected brand with               ○ Replace detected logo of selected brand with
   entered brand 1105                              imported logo 1107

Portal 602

Select advertisement strategy type:
◯ Segment-based 1001
◯ Alignment/Detection-based 1002
● Market-based 1003
◯ User-based 1004

▨ Select content type 1005

▨ Select segment type 1006

▨ Select scene 1101

▨ Select region 1102

▨ Select brand 1103

▨ Select market 1201

Enter brand name 1007 [        ]

Import logo 1008   

Select advertisement action type:

◯ Highlight selected brand 1104    ◯ Add selected brand to selected region 1106

◯ Replace selected brand with entered brand 1105    ◯ Replace detected logo of selected brand with imported logo 1107

Portal 602

Select advertisement strategy type:
○ Segment-based 1001
○ Alignment/Detection-based 1002
○ Market-based 1003
● User-based 1004

▧ Select content type 1005
▧ Select segment type 1006
▧ Select scene 1101
▧ Select region 1102
▧ Select brand 1103
▧ Select user(s) 1301

Enter brand name 1007 [        ]

Import logo 1008  

Select advertisement action type:
○ Highlight selected brand 1104
○ Replace selected brand with entered brand 1105
○ Add selected brand to selected region 1106
○ Replace detected logo of selected brand with imported logo 1107

AUGMENTING CONTENT USING CONTEXTUAL FEATURES

BACKGROUND

Viewers watching a content item may view certain features (e.g., advertisements, events, objects, people, etc.) when they appear, for example, on screen when the cameras shift to show different views. Viewers may view the features in various regions, for example, of the screen, such as the center, sides, top, bottom, and/or other regions. Events shown within content items may be associated with various emotions, excitement levels, and/or other sentiments. For example, a content item may show an exciting event (e.g., cheering), and viewers may experience increased engagement with the content item for the exciting event (or for events associated with other sentiments).

SUMMARY

The following summary presents a simplified summary of certain features. The summary is not an extensive overview and is not intended to identify key or critical elements.

Systems, apparatuses, and methods are described for contextually augmenting content (e.g., in-video contextual advertising). Various types of content, such as sporting events, news shows, cooking shows, home improvement shows, and/or other types of content, may be augmented by adding and/or modifying advertisements in regions of video for that content. Such regions may, for example, comprise regions that are idle or regions in which there may already be an existing advertisement (e.g., an advertisement appearing in the background on a stadium wall). Advertisements and/or augmentation features used to augment content, and/or whether to augment content, may be determined based on one or more advertising strategies. For example, an advertisement strategy may indicate whether and/or how to augment content based on emotion(s) and/or other characteristics associated with a content segment, based on brands and/or logos detected in a content segment, based on market-related characteristics associated with a content item, and/or based on user-related characteristics associated with one or more users expected to view the content item.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7 shows a table comprising example content types and example segment types associated with the example content types.

FIG. 8 shows a table comprising example advertisement strategy parameters for augmenting content.

FIGS. 9A, 9B, and 9C show example interfaces for selecting and/or configuring advertisement placements.

FIG. 10 shows an example interface for selecting and/or configuring segment-based advertisement strategies.

FIG. 11 shows an example interface for selecting and/or configuring alignment/detection-based advertisement strategies.

FIG. 12 shows an example interface for selecting and/or configuring market-based advertisement strategies.

FIG. 13 shows an example interface for selecting and/or configuring user-based advertisement strategies.

DETAILED DESCRIPTION

Figure 1:
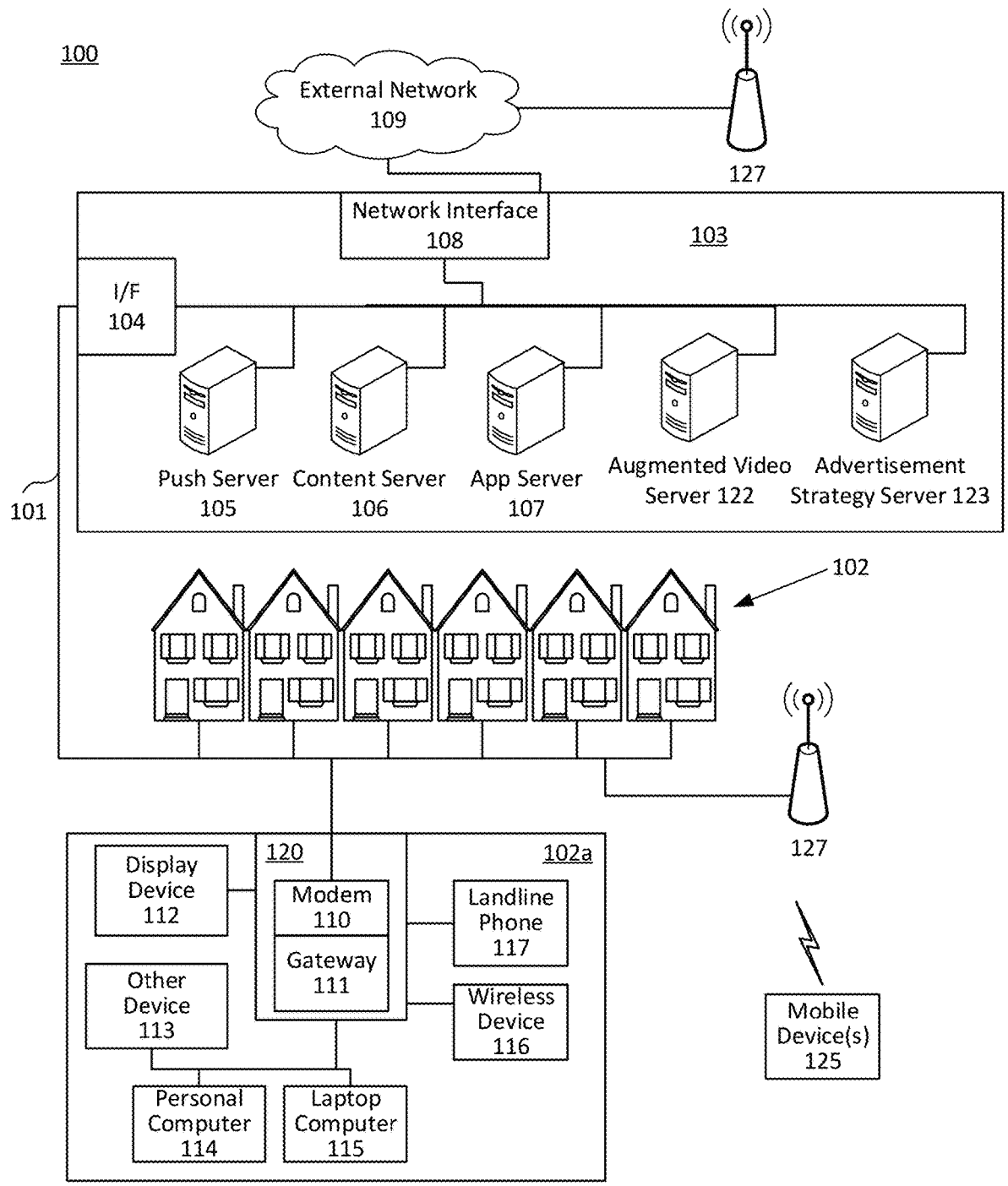
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122-123, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the augmented video server 122 which may store and/or generate augmented video based on advertisement strategies (further described below), the advertisement strategy server 123 which may store and/or generate advertisement strategies (further described below), additional push, content, and/or application servers, and/or other types of servers. Also or alternatively, one or more of the push server 105, the content server 106, the application server 107, the augmented video server 122, and/or the advertisement strategy server 123 may be part of the external network 109 and may be configured to communicate (e.g., via the local office 103) with computing devices located in or otherwise associated with one or more premises 102. Although shown separately, the push server 105, the content server 106, the application server 107, the augmented video server 122, the advertisement strategy server 123, and/or other server(s) may be combined. The servers 105, 106, 107, 122, and 123, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
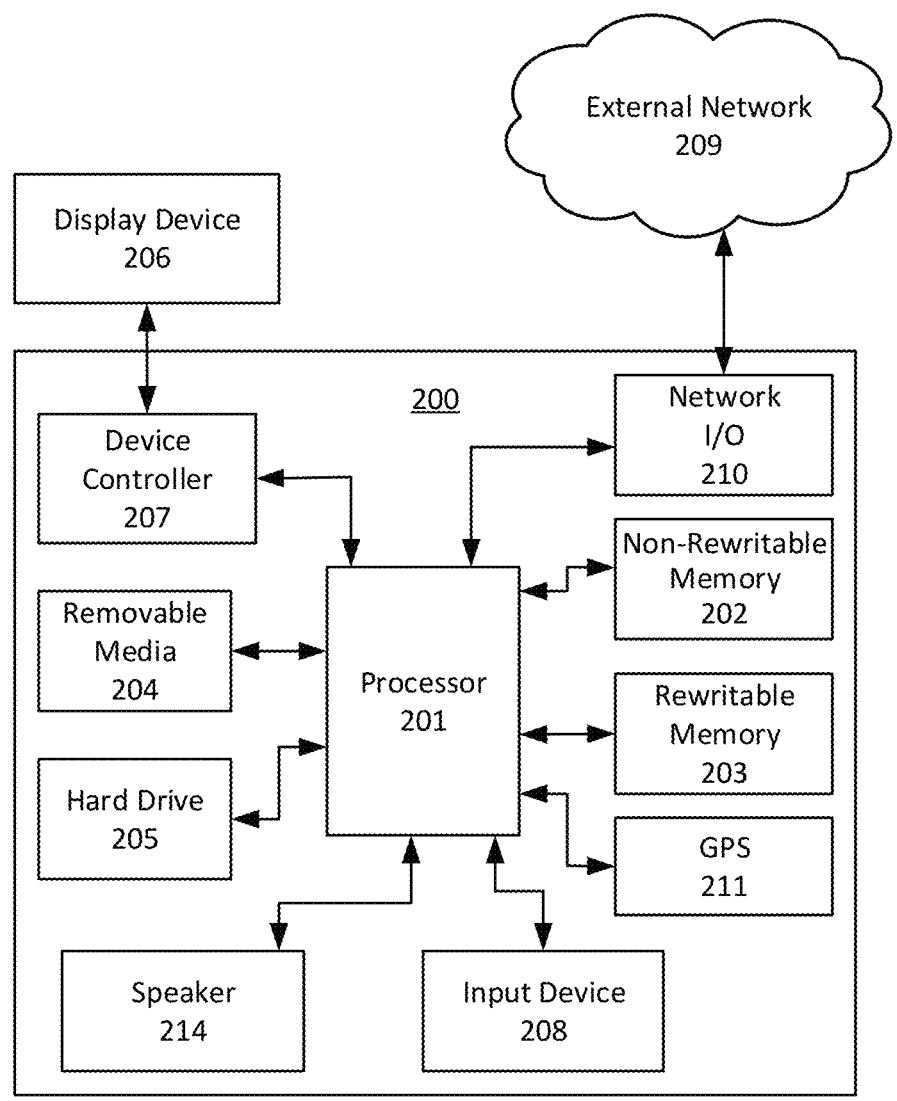
FIG. 2 shows example hardware elements of an example computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109), any user devices described herein, and any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

As will be described herein, contextual advertising may be output on-stream during presentation of content items such as sporting events, talk and/or news shows featuring talking heads, cooking shows, home improvement shows, and/or other types of content items. Such contextual advertising (and/or other types of information) may be output by augmenting content segments of a content item to include added advertising and/or other types of information. Information may be added based on segment types associated with content segments of a content item. Segment types may comprise segment types associated with levels or amounts of activity in a content segment. For example, idle content segments (associated with an idle segment type) may comprise content segments in which there is little or no activity, silent content segments (associated with a silent segment type) may comprise content segments in which there is little or no audio, slow content segments (associated with a slow segment type) may comprise content segments in which objects move slowly, etc. Segment types may comprise segment types associated with one or more predicted reactions from users viewing a content segment (e.g., users watching video of a content segment and/or listening to audio of a content segment). Boring content segments (associated with a boring segment type) may comprise content segments predicted to be found uninteresting by users. Negative content segments (associated with a negative segment type) may comprise content segments predicted to cause a negative emotional response by users (e.g., angry content segments associated with an angry segment type, disappointing content segments associated with a disappointing segment type, sad content segments associated with a sad segment type, etc.). Positive content segments (associated with a positive segment type) may comprise content segments predicted to cause a positive emotional response by users (e.g., exciting content segments associated with an exciting segment type, happy content segments associated with a happy segment type, proud content segments associated with a proud segment type, etc.). The above are merely examples, and segment types may also or alternatively comprise segment types associated with other types of emotions and/or reactions. User reactions to a content segment may, for example, be predicted based on reactions to similar content segments (e.g., associated with similar events) previously output.

Content may be augmented with contextual advertisements based on one or more advertisement strategies. Advertisement strategies may comprise segment-based strategies that augment content based on segment types associated with content segments of a content item. Also or alternatively, advertisement strategies may comprise alignment/detection-based strategies that augment content based on events (e.g., advertisements, regions of low or no activity) that may be detected in regions of a content segment (e.g., regions of video frames) and aligning augmentation advertisements and/or effects with those events. Also or alternatively, advertisement strategies may comprise market-based strategies that augment content based on geographic information, market data, and/or other factors. Also or alternatively, advertisement strategies may comprise user-based strategies that augment content based on user demographics, user data, and/or other factors. Advertisement strategies will be further described below in connection with FIGS. 14A-17D.

Advertisement strategies, and/or aspects of these strategies as described herein, may be combined. For example, a content segment of a content item showing a Formula 1 (F1) race may comprise a boring content segment before the start of the race. That boring content segment may be identified based on video, audio, and/or metadata associated with the content segment. Presentation of an advertisement during the boring segment may increase viewer engagement. Analysis of video and/or audio associated with other content segments of the F1 race content item may determine other types of segments (e.g., boring, exciting, positive, negative, etc.). A brand logo may be identified in a content segment (e.g., a logo of a driver's sponsors on a car, a billboard or other advertisement in the background, etc.). As part of an advertisement strategy that combines segment-based aspects, and alignment/detection-based aspects, a content segment of the F1 race content item may be augmented to show an advertisement for the brand associated with the identified logo in a particular region during the boring content segment. The region of the content segment video in which the advertisement is placed may be idle, empty, devoid of useful graphics and/or information, have low activity, and/or may be otherwise convenient. Based on such an advertisement strategy, augmenting the boring content segment with an advertisement for a detected brand may increase viewers' engagement with the boring content segment, and may increase generated revenue.

Also or alternatively, any type of content segment may be selected for augmentation (e.g., exciting content segments, energetic content segments, negative content segments, boring content segments, etc.) For example, an exciting content segment may be selected for augmentation. Exciting content segments may be associated with higher viewer engagement. Augmenting an exciting content segment may, for example, be associated with more viewers seeing the placed advertisement based on the higher viewer engagement. For example, a content segment comprising a goal scored at the 87th minute of a soccer match (near the end of the match), may be an exciting content segment. Viewers watching the soccer match may experience increased engagement with the match, for example, if an exciting event occurs (such as the 87th-minute goal). Augmenting the exciting content segment with a new advertisement during (or based on) the exciting event, may result in more viewers seeing the placed advertisement, since viewers may pay more attention for exciting events and/or more viewers may tune in for exciting events. While these features have been described for an exciting content segment, they may be similarly implemented for other types of content segments, as described herein.

The features described herein may be applied to preprocessed content (e.g., time-shifted content, multicast content, etc.), live content, and/or other types of content. In the case of preprocessed content items, the content items may be processed (e.g., by the augmented video server 122) prior to a time that such content may be available for output to devices such as user devices. Processing content items prior to the time of output may be performed without time constraints. For example, a preprocessed content item may be a rerun of a soccer match being output at a time other than the original time. The soccer match content item may have been previously analyzed in order to identify segments, segment types, event characterization criteria, and/or existing brands and/or advertisements in the content item. The results of the analysis may be stored in the content server 106, the augmented video server 122, and/or other locations. In the case of live content, a buffer may be used such that the duration of the buffer may be sufficient time for processing. The buffer may be an amount of storage space that may correspond to an amount of time (e.g., a duration of a portion of content that the buffer can hold). The buffer may be variously long (the length may be constant or dynamically change), for example, the buffer may be a few seconds or minutes long, or otherwise as long as determined by operators (e.g., backend personnel) and/or by devices implementing the features described herein (e.g., devices in the premises 102, devices in the local office 103, etc.). For example, a multicast of a live soccer match may be analyzed using a buffer of 30 seconds. The analysis performed for live content may be a simpler version (e.g., analyzing fewer features in detail, briefly analyzing more features, and/or otherwise computationally less intensive, etc.) than analysis which is performed for preprocessed content.

Figure 3:
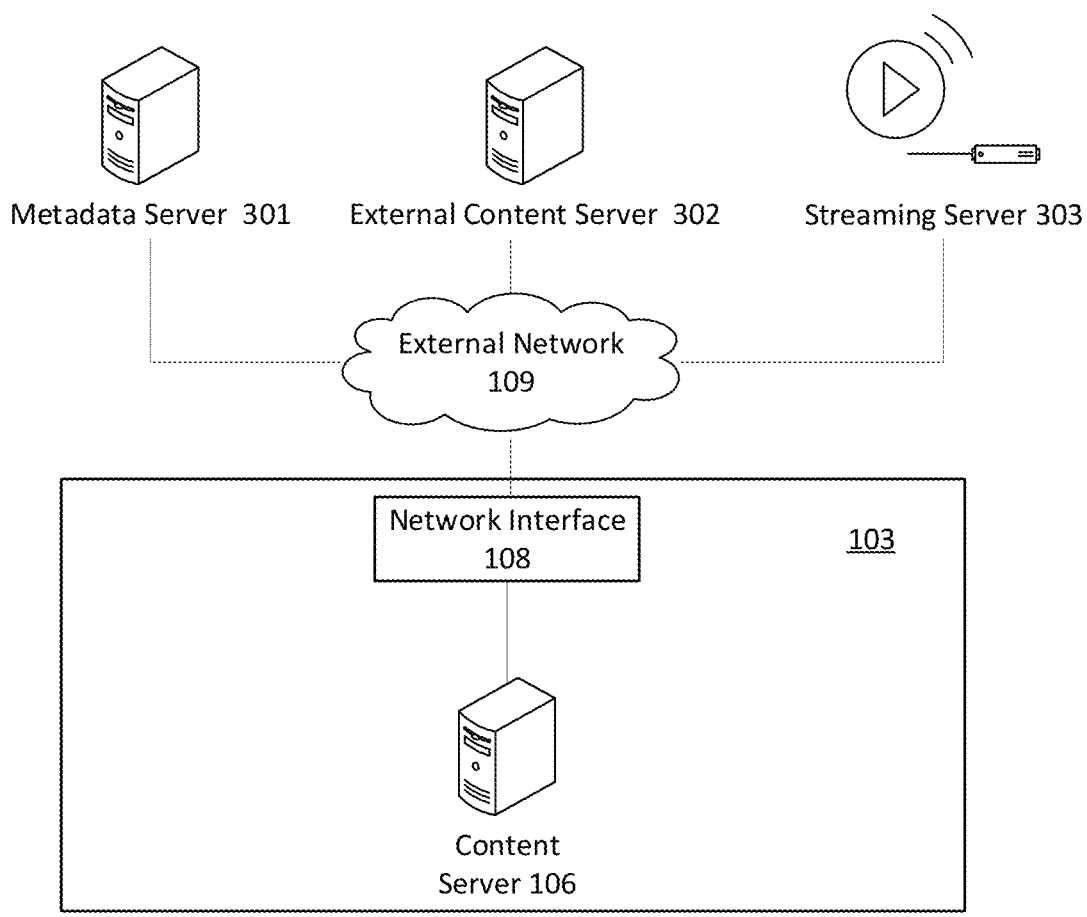
FIG. 3 shows an example environment 300 in which content may be communicated.

FIG. 3 shows an example environment 300 in which content may be received and/or transmitted. Received content may be analyzed, augmented, and/or otherwise processed to comprise additional content such as contextual advertising. Content received and/or transmitted via the environment 300 may comprise video and/or audio for content items received from a streaming server 303. Content may comprise types of content described above (e.g., coverage of sporting events, etc.), as well as gaming data and/or other types of content. Metadata may be received from a metadata server 301. An external content server 302 may store content from external sources (e.g., from content providers, social media services, websites, and/or others, etc.). Content and/or metadata transmitted from the servers 301-303 may be received by the content server 106 via the external network 109. For example, a YouTube video of a cooking show may be transmitted by the external content server 302 to the content server 106 via the external network 109. The content associated with the YouTube video may be analyzed to determine segment types of content segments. Based on the determined segment types, and based on one or more advertisement strategies, an advertisement placement opportunity may be identified. For example, an advertisement targeting a specific viewer or group(s) of viewers based on a cooking ingredient brand detected in the video background may be placed in an empty region of the video during an idle segment, such as the video host washing their hands.

Figure 4:
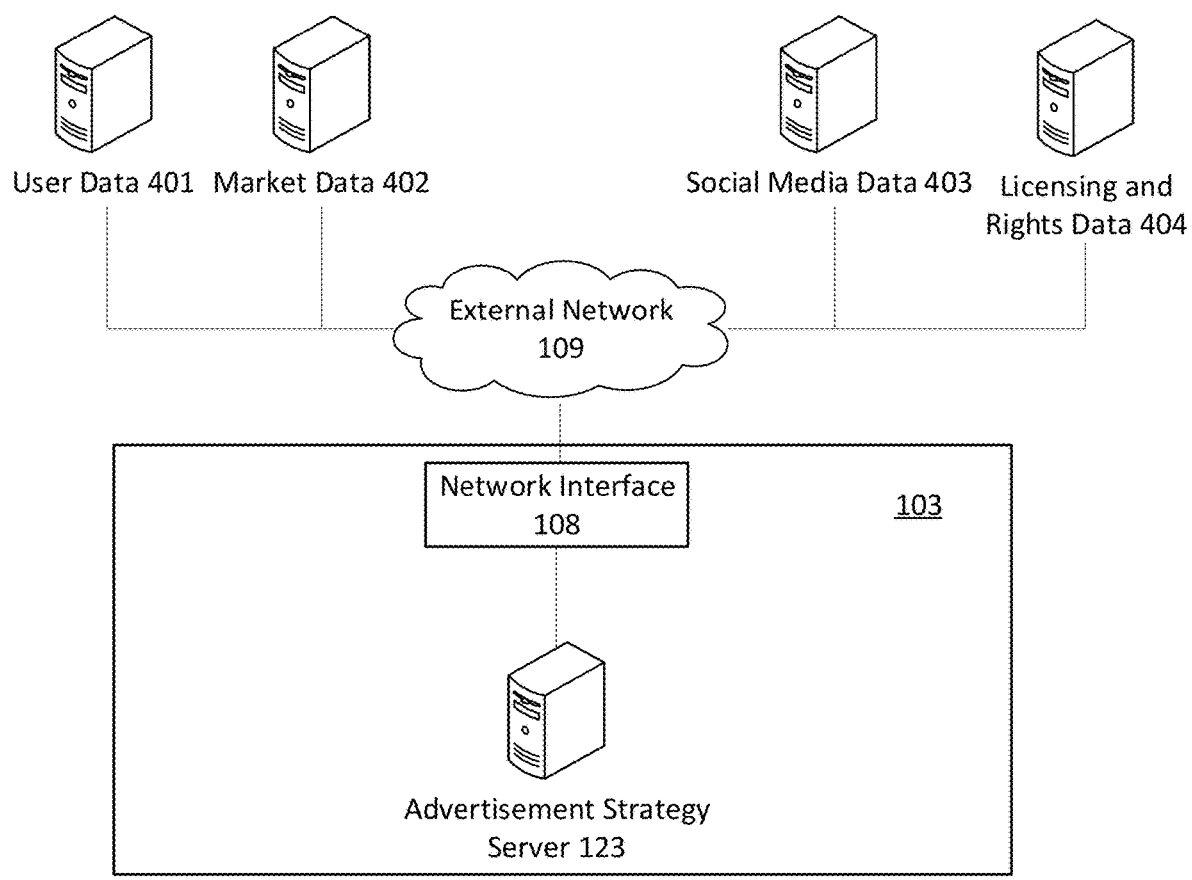
FIG. 4 shows an example environment 400 in which advertisement strategies may be communicated.

FIG. 4 shows an example environment 400 in which advertisement strategies may be communicated. Placement of advertisements may be based on various factors. Such factors may, for example, comprise market data, user data, and/or licensing and rights data. The augmented video server 122 may determine whether advertisements may be placed. The advertisement strategy server 123 may create and/or store advertisement strategies and/or provide advertisement strategy records to the augmented video server 122. The advertisement strategy server 123 may communicate with external servers via the external network 109. External servers may comprise a user data server 401, a market data server 402, a social media data server 403, a licensing and rights data server 404, and/or other servers. The advertisement strategy server 123, further described below in connection with FIG. 6, may generate advertisement strategies based on information received from one or more of the servers 401-404 and/or other servers and/or based on information input by one or more operators. Advertisement strategies may indicate types of advertisements to place in a content item based on various factors comprising user data (e.g., user demographics, purchase history, etc.), market data (e.g., regional sports team affiliations, etc.), social media data (e.g., trending brands, online controversies, etc.), licensing and rights data (e.g., who may own certain space, which brands may already be represented, venue affiliations, sponsors, etc.), and/or other types of data. The advertisement strategy server 123 may respond to selected advertisement strategies based on information received from the servers 401-404.

For example, during a sporting match content item, a user-based advertisement strategy may be selected for an individual user and/or one or more groups of users based on common traits. The user-based strategy may indicate that an advertisement should be placed based on a user's previous shopping history for team merchandise. The user's data may be retrieved via the server 401. The user's social media activity, which may be retrieved via the social media data server 403, may be searched in order to determine demographic data, favorite teams, preferred brands, and/or other information which may be used in suggesting advertisements. The advertisement strategy server 123 may query the server 404 for information relating to ownership rights of advertisement space in the venue, sponsors and/or brands associated with the sports teams, etc. The user may have previously purchased a sponsor-branded jersey associated with the home team, so the advertisement strategy may suggest that sponsor's advertisement. Upon querying the server 404, the advertisement strategy server 123 may obtain information indicating that the sponsor is no longer affiliated with the home team, so the advertisement strategy may be rejected.

As another example, and for a market-based advertisement strategy implemented during a sporting match content item, market data may be retrieved from the market data server 402. That market data may comprise geographic location(s) at which the match may be streaming (e.g., the premises 102), local team affiliations, advertisements for local businesses, and/or other market data. The social media data server 403 may comprise data such as locally trending brands, athletes, scandals, and/or other data. Social media data indicating a locally trending business may be retrieved, and the market-based strategy may suggest a related advertisement based on the social media data.

Figure 5:
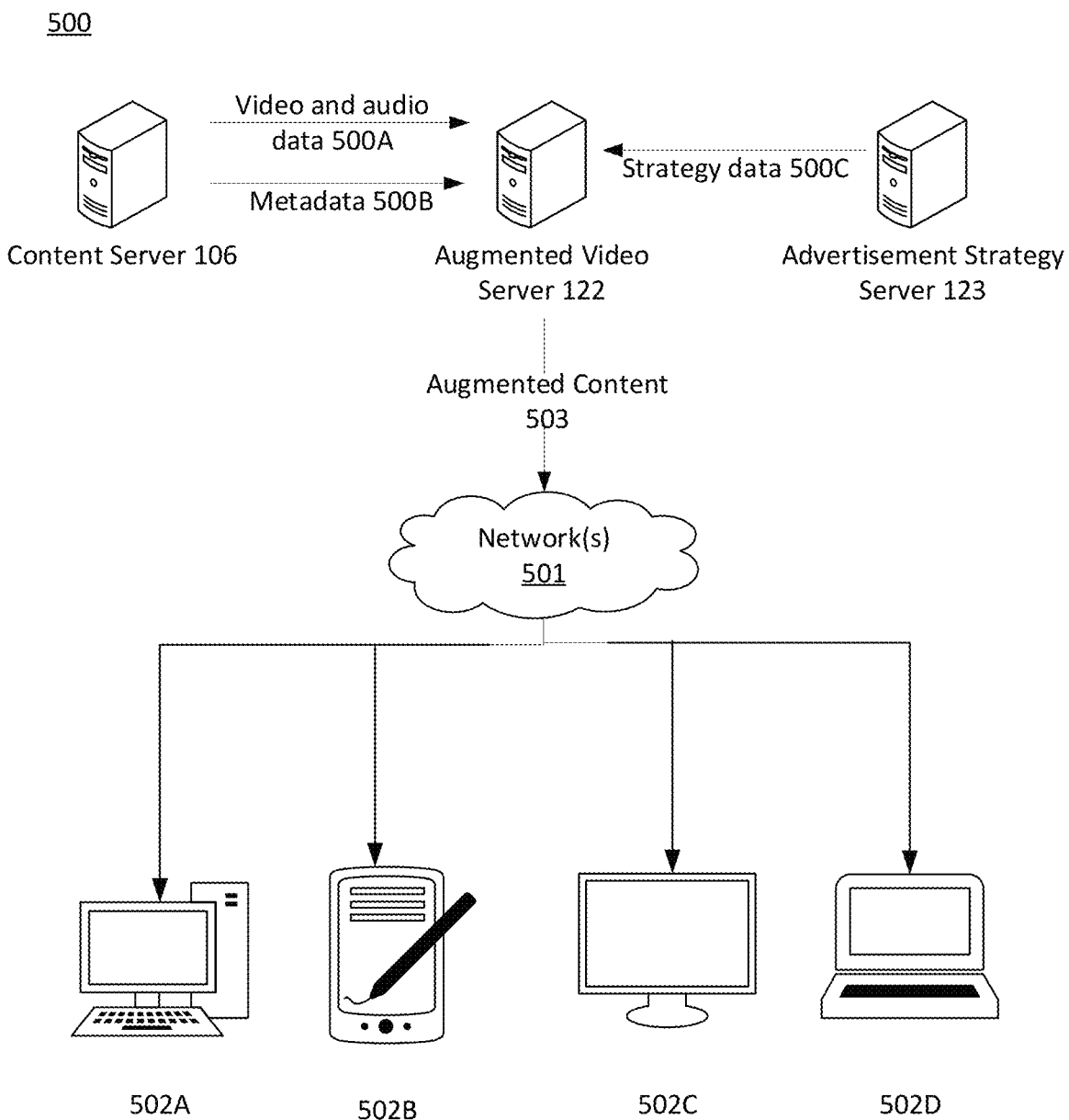
FIG. 5 shows an example environment 500 for communicating content data, advertisement strategy data, and/or augmented video.

FIG. 5 shows an example environment 500 for communicating content data, advertisement strategy data, and/or augmented video. Based on advertisement strategies, augmented video (comprising secondary content, e.g., advertisements) may be created by the augmented video server 122 and output (e.g., to and/or via user devices 502A-502D). The environment 500 comprises network(s) 501, which may be internal and/or external networks. The network(s) 501 may comprise the links 101 and/or the external network 109 (e.g., if the content server 106, the augmented video server 122, and/or the advertisement strategy server 123 are located in the external network 109). The augmented video server 122 may generate, store, and/or output augmented video 503, which may be based on information received from the content server 106, the advertisement strategy server 123, and/or other servers. The content server 106 may transmit video and audio data 500A and/or metadata 500B to the augmented video server 122. The advertisement strategy server 123 may transmit strategy data 500C to the augmented video server 122.

User devices 502A-502D may receive the augmented video 503 via the network(s) 501. The user devices 502A-502D may comprise computing devices in the premises 102. Users may receive, view, and/or access the augmented content via the user devices 502A-502D, which may comprise, for example, personal computers, smartphones, televisions, laptop computers, tablet computers, gaming systems, smart devices, IoT devices, and/or other computing devices.

For example, the augmented video server 122 may receive content such as the video and audio data 500A and/or the metadata 500B for a sporting match content item. The video and audio data 500A and/or the metadata 500B for the sporting match content item may comprise associated video data, metadata, audio data, closed captioning data, and/or other data, which may be transmitted by the content server 106. The augmented video server 122 may receive one or more advertisement strategies via the strategy data 500C, which may be customized based on various factors (e.g., viewers' demographic information, previous shopping history, advertisement engagement, and/or any combination thereof) from the advertisement strategy server 123. Based on the advertisement strategy, the augmented video server may generate the augmented content 503 based on the received content. The augmented content 503 may, for example, comprise video (e.g., from the video and audio data 500A) that has been augmented to comprise an additional content item (such as an advertisement, which may be based on a brand identified in the sporting match content item) placed in a region of the screen. Advertisements may be retrieved from the content server 106 and/or other servers. The augmented content 503 may be transmitted via the network(s) 501 to any number of devices, such as the user devices 502A-502D. The advertisement strategy may have been a user-based advertisement strategy, so viewers and/or groups of viewers may have received augmented video with augmentations based on their own details, described further below. The example environments of FIGS. 3-5 and/or the features shown therein may be combined.

Figure 6:
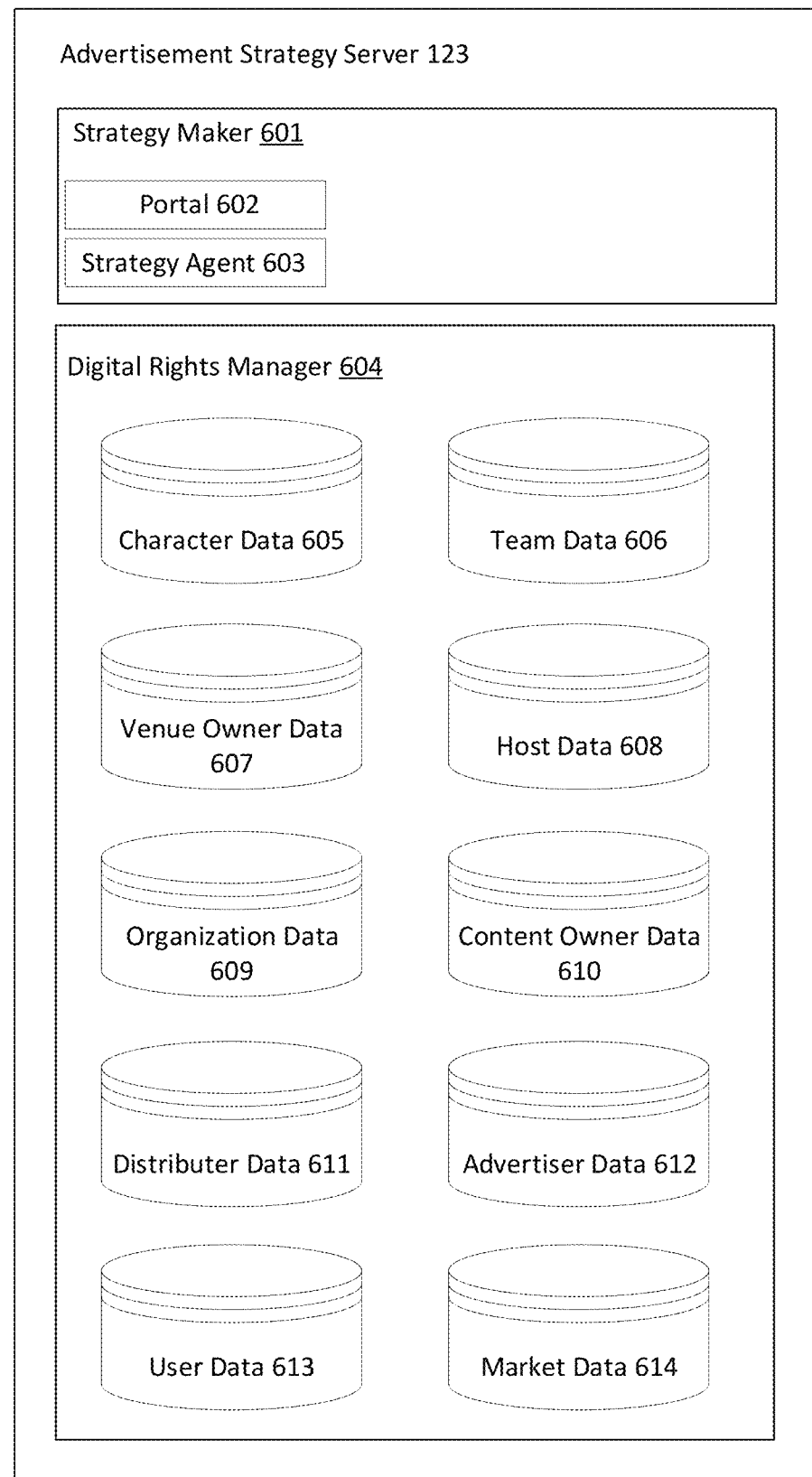
FIG. 6 is a diagram showing features which may be comprised by an example advertisement strategy server.

FIG. 6 is a diagram showing additional features which may be comprised by the advertisement strategy server 123. Advertisement strategies may be selected and/or configured automatically, by operators (e.g., backend personnel), or by some combination thereof, for example, via the advertisement strategy server 123. The advertisement strategy server 123 may comprise various components, for example, a strategy maker 601 and a digital rights manager 604. The strategy maker 601 may further comprise a portal 602 and a strategy agent 603. The strategy maker 601, digital rights manager 604, portal 602, and/or strategy agent 603 may comprise one or more software programs comprising instructions that, when executed by one or more processors of the advertisement strategy server 123, cause the advertisement strategy server 123 to carry out operations of the strategy maker 601, digital rights manager 604, portal 602, and/or strategy agent 603 described herein.

An operator may use the strategy maker 601, via the portal 602, to select an advertisement strategy and/or its associated parameters. Also or alternatively, the strategy agent 603 may automatically select and/or generate advertisement strategies. The strategy agent 603 may handle backend connections, for example, those of the portal 602 to other components such as databases. Also or alternatively, the strategy agent 603 may handle backend connections via automatically selecting, generating, accepting, and/or rejecting advertisement strategies. The digital rights manager 604 may comprise various databases, for example character database 605 (e.g., storing athlete data, performer data, etc.), team database 606 (e.g., storing sports team data, brand data, etc.), venue owner database 607 (e.g., storing stadium owner data, etc.), host database 608 (e.g., storing content presentation platform data, etc.), organization database 609 (e.g., storing sports organization data, talent management agency data, record label data, etc.), content owner database 610 (e.g., storing content owner data, content rights data, etc.), distributer database 611 (e.g., storing content distributer data, content platform data, content network data, content channel data, etc.), advertiser database 612 (e.g., storing advertisements, advertisement owner data, etc.), user database 613 (e.g., storing user data, demographic data, purchase history, etc.), and/or market database 614 (e.g., storing market data, market-specific local business data, etc.). The digital rights manager 604 may query any of these databases and/or other databases (e.g., to verify digital rights). Also or alternatively, any of the databases shown in FIG. 6 may be implemented by one or more computing devices separate from the advertisement strategy server 123.

A user may access the portal 602 and/or the strategy agent 603 to select and/or configure an advertisement strategy (further described in connection with FIGS. 10-13), which may be segment-, alignment/detection-, market-, and/or user-based. A market-based strategy, for example, may be selected for viewers accessing a sports content item for a Philadelphia Eagles game in the greater Philadelphia area. The digital rights manager 604 may query various databases 605-614 to determine ownership and/or licensing rights. Based on the results of the digital rights search, the strategy agent 603 may accept or reject the advertisement strategy. For example, the market-based strategy may comprise instructions to augment the content item to comprise an advertisement for a local Philadelphia-area business. The digital rights manager 604 may determine that the local business has a licensing agreement with the stadium hosting the game, based on querying the venue owner data 607. The strategy agent 603 may further accept the market-based strategy. Based on the determination that the stadium and local business have a licensing agreement, instructions may be stored (e.g., associated with the market-based strategy) indicating that advertising revenue resulting from this advertising strategy may be distributed to the parties of interest (e.g., the local business and the stadium, based on their agreement). The processes involved with selecting and/or generating advertisement strategies may be partially or fully automated. Descriptions of operators selecting advertisement strategies are illustrative and are not intended to exclude automated processes.

FIG. 7 shows a table 700 comprising example content types and example segment types associated with the example content types. Advertisement strategies may be applied to various types of content. Segment-based strategies, for example, may be applied based on segment types. The example data shown in the table 700 may be stored in various locations (e.g., the content server 106, the augmented video server 122, the advertisement strategy server 123, and/or other locations). Each of the content types 701 may comprise video, audio, text, gaming, and/or other content which may be output to users. For example, content may comprise coverage of sporting events (e.g., soccer, Formula 1, golf, cricket, etc.), news and/or talk shows with talking heads, cooking shows, home improvement shows, etc. Segment types and examples for these content types may comprise exciting segments 702, negative segments 703, idle segments 704, happy segments 705, angry segments 706, and/or other segment types 707 (e.g., segments associated with emotions, moods, events, and/or other factors, which may be customized).

A soccer match, for example, may comprise several opportunities for content augmentation. As shown in FIG. 7, exciting segments may comprise goals, shots on target, keeper saves, keeper punches, and/or other events; negative segments may comprise fouls, injuries, yellow cards, red cards, challenges, missed shots, and/or other events; idle segments may comprise substitutions, team set ups, and/or other events; and angry segments may comprise unfair calls by referees and/or other events. The classification of segments by type may depend on target users and/or target markets. For example, a shot on target by Team A may be a negative segment for supporters of Team B and a positive segment for supporters of Team A. Content may be augmented based on advertisement strategies that take segment types into consideration, as described below in relation to FIG. 8.

FIG. 8 shows a table 800 comprising example advertisement strategy parameters for augmenting content. As shown in table 800, advertisement strategy parameter types may comprise actions 801, action timing (e.g., when to show) 802, action type (e.g., what to show) 803, and/or action location (e.g., where to show) 804. The actions 801 may comprise highlighting and/or replacing existing advertisements, adding existing advertisements to other regions in the content, changing logos of existing brands, and/or other actions. Existing advertisements may comprise those already present in the content, such as sideline ads, etc. The action timing 802 may indicate when to perform the actions 801 (e.g., during certain segment types, strategy-based events, and/or others). The action type 803 may indicate how the content may be augmented, for example, for an action of highlighting an existing advertisement which may be in the background of a video, a logo from the detected background advertisement may be placed in the foreground of the video. The action location 804 may indicate regions (e.g., within video of a content segment) in which the augmentation may be performed. The location, in the content item, in which the augmentation may be performed may be selected based on various factors. For example, regions may be selected for augmentation if they are determined to be less dynamic than a certain threshold (e.g., for a sports match, if the players are primarily concentrated near the center of the video, the edges may be considered less dynamic). Regions may be selected if they comprise existing brands (e.g., the augmentation may comprise placing a video advertisement for a certain brand over a static sideline billboard of the same brand). Regions may be selected for augmentation if they comprise predefined locations (e.g., a content distribution platform may designate a specific region for placement of advertisements).

Also or alternatively, an operator (or advertiser, content owner, etc.) may choose to augment only segments of certain types. For example, the operator may exclude segments of the angry type from augmentation with advertisements for a certain brand. Similarly, the operator may, for example, exclude segments of any type from augmentation in order to prevent association of certain brands with certain segment types. For example, excluding angry segment types from augmentation with advertisements for an athletic shoe brand may increase brand protection for the shoe brand.

Figure 9B:
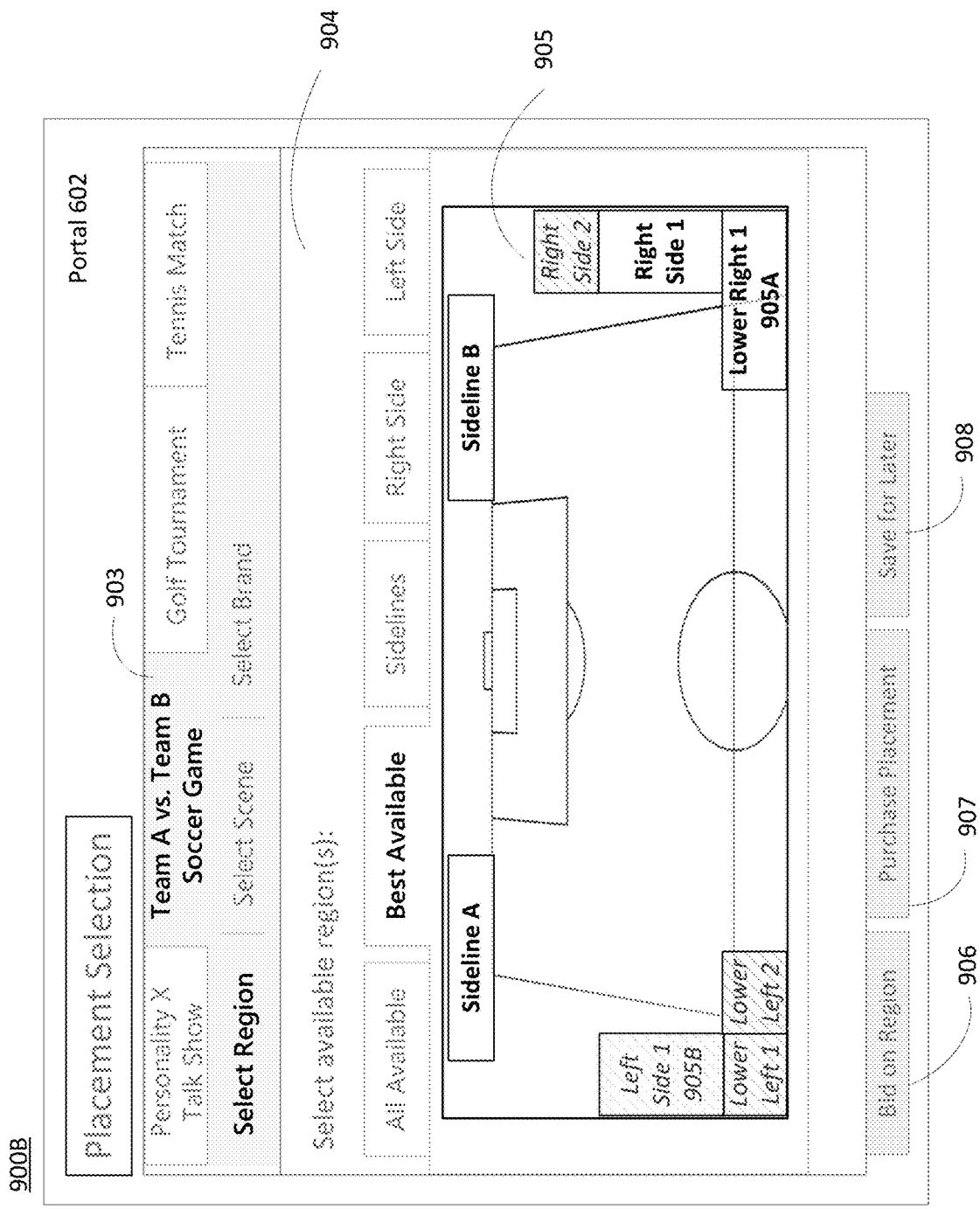
Figure 9C:
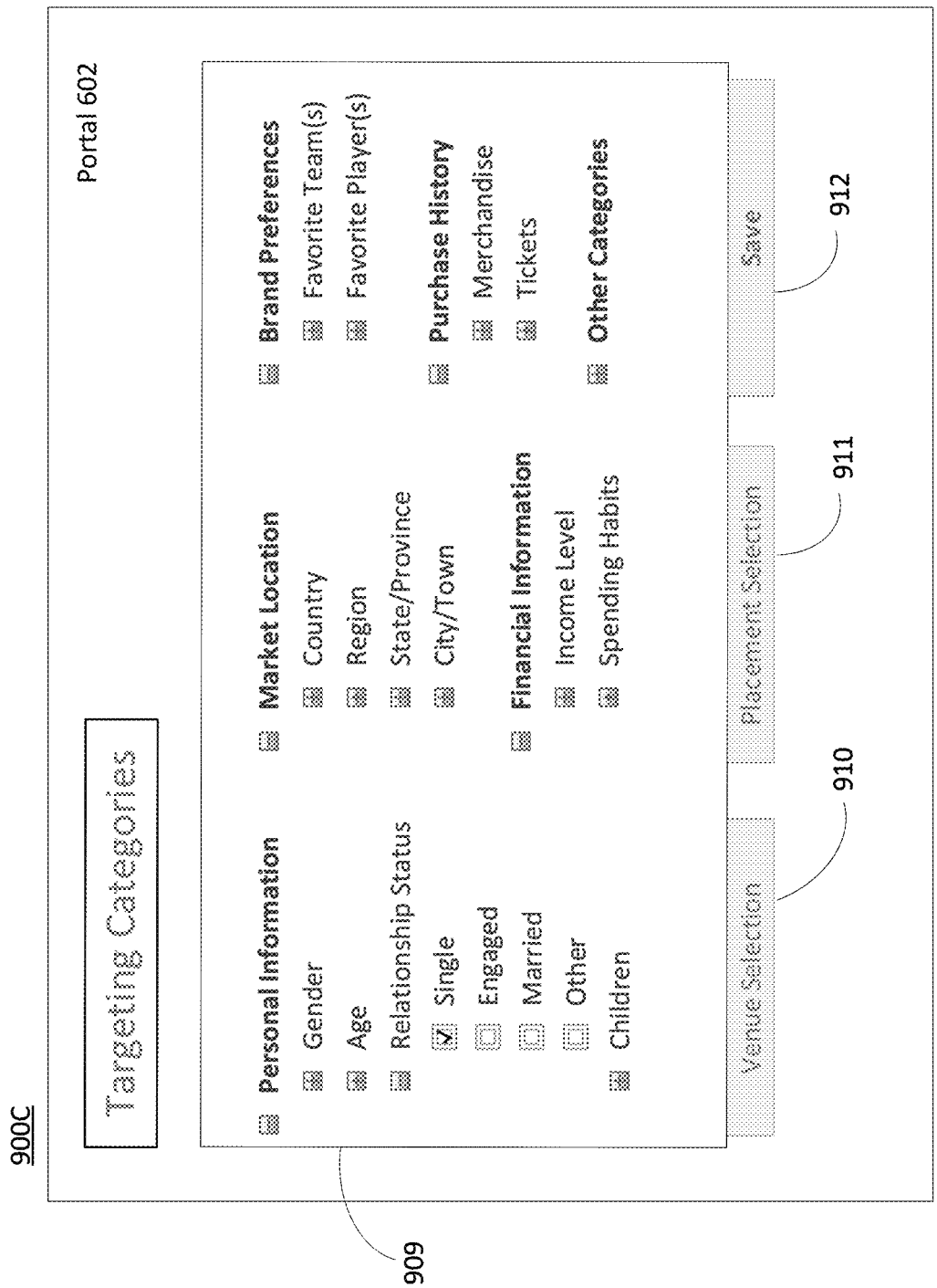

FIGS. 9A-9C show example interfaces which may be used to configure the advertisement strategy server 123 to implement features described herein. For example, the interfaces of FIGS. 9A-9C may be output via the portal 602 and may receive operator input to select and/or configure advertisement strategies. Augmentation of content based on features described herein may be performed automatically, by operators (e.g., backend personnel), or by some combination thereof.

FIG. 9A shows an example interface 900A, which may be used to select content placements (e.g., advertisements and/ or other augmentations) based on a location hosting an event in the content. For example, an operator may wish to select an advertisement placement for events hosted by a venue 901 (e.g., the Soccer Stadium which may be the Team B home venue). The interface 900A may further display available events 902, from which the operator may make selections. The available events 902 may comprise a column 902A for event titles, a column 902B for teams (or other event participants), and/or a column 902C for options. For example, the operator may select the League Final Match, and the teams column 902B may indicate that Semi-Finals 1 Winner and Semi-Finals 2 Winner may be the participating teams (e.g., Team A and Team B). Based on this information, the operator may determine partnerships for the teams, market-based strategies, and/or other information which may influence the content augmentation. The options column 902C may allow the operator to select an action to perform. For example, the operator may wish to select placements for the League Final Match, which will be further detailed for FIG. 9B. Various selectable options (e.g., links) for each of the categories 901-902 may be available for the operator.

FIG. 9B shows an example interface 900B, which may be used to select regions, within content segments, for placement of advertisements and/or other augmentations. The interface 900B may be reached based on selecting one of the options from the column 902C in FIG. 9A (e.g., to select placement). The operator may view available regions for events 903, such as for the League Final Match discussed above. An interface element 904 may allow the operator to view available regions based on various categories, for example, all available regions, best available regions, sideline regions, right side regions, left side regions, and/or other categories. A content viewer 905 may indicate the available regions in the content at various times (e.g., the regions may be highlighted and/or selectable). The content viewer 905 may show regions in a scene of a content item for which an advertisement strategy may be configured. Also or alternatively, the content viewer 905 may show regions for advertisement placement in an example content item (e.g., based on previous and/or similar content).

Lower Right 1 region 905A may, for example, be highlighted as one of the best available determined regions, and Left Side 1 region 905B may be a selectable region that is not highlighted as one of the best available regions. Best available regions may be associated with increased viewer engagement. The operator may select one or more regions for placement of one or more augmentations. Once one or more regions have been selected, the operator may select one or more interface elements to perform various actions. For example, the operator may select interface element 906 to bid on one or more of the regions in the content viewer 905. The operator may select interface element 907 to purchase placement at one or more of the selectable regions in the content viewer 905. The operator may select interface element 908 to save region and/or placement selections for another time. Bidding on regions and/or direct purchase of placements in regions may increase revenue for various parties (e.g., venue owners, teams, etc.).

FIG. 9C shows example interface 900C, which may indicate various targeting categories which may be selected to personalize advertisements based on markets, individual users, groups of users, households, and/or other categories. Targeting categories 909 may comprise demographic categories such as personal information (e.g., gender, age, relationship status, number of children, etc.), market location (e.g., country, region, city, state, etc.), financial information (e.g., income level, spending habits, etc.), brand preferences (e.g., favorite teams, favorite players, etc.), purchase history (e.g., merchandise, tickets, etc.), and/or other categories. For example, an operator selecting advertisement placement may use the targeting categories 909 to find advertisements to place in selected content segment regions that target certain types of viewers (e.g., single users with a favorite team such as Team B and a purchase history of Team B merchandise). Detailed targeting as shown in the example in FIG. 9C may encourage increased viewer engagement with placed advertisements (e.g., greater likelihoods of viewers clicking through advertisements and making purchases since the placed advertisements may be tailored to their specific preferences, etc.)

FIGS. 10-13 show example interfaces for selecting and/or configuring advertisement strategies for augmenting content. The interfaces of FIGS. 10-13 may be implemented by the portal 602.

FIG. 10 shows an example interface 1000, for segment-based advertisement strategies, that may be presented based on selection of an option corresponding to "Segment-based" strategy 1001. Segment-based strategies may augment content based on various segment types (e.g., emotional, exciting, idle, negative, etc.), as described above for FIG. 7. A backend operator may select a strategy from strategies 1001-1004—segment-based 1001, alignment/detection-based 1002, market-based 1003, user-based 1004, and/or others. If the operator selects the segment-based strategy 1001 option, they may be prompted to select a content type 1005 and/or select a segment type 1006. The operator may be prompted to input a brand name 1007 and/or import a logo 1008. For example, the operator may select soccer as the content type, exciting segments as the segment type, a specific sports drink brand as the brand name, and import that brand's logo. Based on this segment-based advertisement strategy, exciting content segments such as goals in the soccer match may be detected, and those exciting content segments may be augmented to highlight and/or show the sports drink brand in those content segments. For example, the augmentation may comprise showing an animated logo over a static sideline billboard, placing an advertisement image for the sports drink in a desirable region of the content segments, etc.).

FIG. 11 shows an example interface 1100, for alignment/detection-based advertisement strategies, that may be presented based on selection of an option corresponding to an "Alignment/Detection-based" strategy 1002. Presenting contextual advertisements may comprise detecting brands and/or logos in the content item (e.g., sponsors printed on a Formula 1 racecar), identifying a segment type (e.g., an idle period before a race begins), and augmenting the content item to offer an advertisement based on alignment/detection-based strategies. Alignment/detection-based strategies may be based on identification of brands and/or content segments based on metadata, video data, and/or audio data associated with a content item, as further described below in connection with FIGS. 14A-14B.

For the alignment/detection-based strategy 1002, the operator may be prompted to select options 1101-1103— select aligned/detected scenes 1101, select regions 1102, and/or select aligned/detected brands 1103 identified based on the results of alignment/detection operations performed on the content. For example, the operator may select identified scenes such as goals, identified low-activity regions, and/or identified brands such as sponsors on player jerseys, sideline billboards, etc. Identified elements may be detected within content segments and/or aligned in time within the segments (e.g., the timestamps at which the elements occur may be identified). The operator may be further prompted to select actions for augmenting content. Those actions may, for example, comprise highlighting selected brands detected in a content segment 1104, replacing selected brands with entered brands 1105, adding selected brands to selected regions 1106, and/or replacing detected logos of selected brands with imported logos 1107. The interface 1100 for the alignment/detection-based strategy 1002 may also include the options available for the others of strategies 1001-1004. Based on this alignment/detection-based advertisement strategy, the content segment may be augmented to include an advertisement associated with the brand identified via the aligned/detected sponsor on player jerseys. For example, the augmentation may comprise showing an advertisement in a low-activity region of the content segment for a sports drink brand sponsoring the sports team.

FIG. 12 shows an example interface 1200, for market-based advertisement strategies, that may be presented based on selection of an option corresponding to a "Market-based" strategy 1003. Market-based strategies may be based on various markets, comprising location-based markets, demographic-based markets, and/or other markets. For the market-based strategy 1003, the operator may be prompted to select a market 1201. Options for configuring the market-based strategy 1003 may also comprise the options available for the others of strategies 1001-1004. For example, the operator may select a geographic region as a market (e.g., the greater Philadelphia area). Based on this market-based advertisement strategy, an advertisement related to local businesses associated with the greater Philadelphia area may be selected for augmenting the content segment.

FIG. 13 shows an example interface 1300, for user-based advertisement strategies, that may be presented based on selection of an option corresponding to a "User-based" strategy 1004. User-based strategies may be based on granular viewer data such as the targeting categories shown in the example in FIG. 9C. For the user-based strategy 1004, the backend operator may be prompted to select user(s) 1301. The selection 1301 may comprise selection of individual viewers, groups of viewers such as fans (e.g., fans may be grouped based on common traits such as favorite players.), households, and/or other categories. For an individual viewer, for example, the user-based strategy 1004 may suggest advertisements based on that viewer's personal demographics, purchase history, etc. Based on this user-based advertisement strategy, a Team B fan with a history of purchasing tickets to Team B off-season matches may receive augmented content comprising advertisements for discounted Team B season passes, which may further incentivize the viewer to make purchases, increasing revenue for Team B and their advertising partners.

Figure 14A:
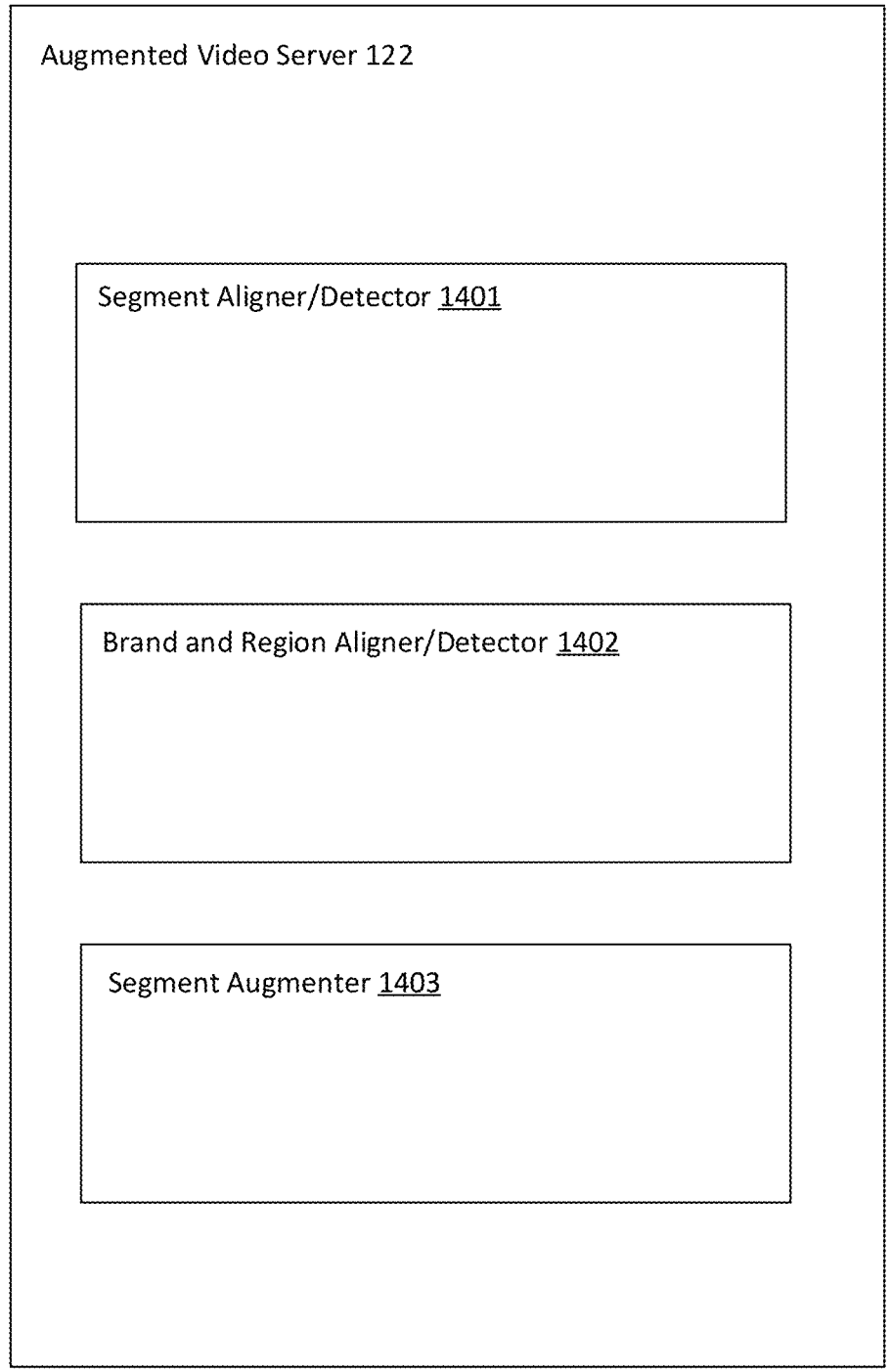
FIGS. 14A and 14B show a plurality of components comprised by an example augmented video server.

FIG. 14A shows a plurality of example components that may be comprised by the augmented video server 122. Those components may comprise a segment aligner/detector 1401, a brand and region aligner/detector 1402, and/or a segment augmenter 1403. The segment aligner/detector 1401, the brand and region aligner/detector 1402, and/or the segment augmenter 1403 may comprise one or more software programs comprising instructions that, when executed by one or more processors of the augmented video server 122, cause the augmented video server 122 to carry out operations of the components 1401-1403 described herein. The segment aligner/detector 1401 may detect segment types of content segments based on events in those content segments (e.g., happy segments based on people cheering) and/or based on metadata associated with those content segments. The segment aligner/detector 1401 may align the detected segments in time within the content segment based on criteria such as timestamps which may indicate when certain events occur in the content item. For example, alignment may indicate that a goal occurs at minute 32 of a soccer match content item. The brand and region aligner/detector 1402 may detect existing brands in the content segment based on identification of logos, advertisements, and/or other features in the venue, on player jerseys, on the sidelines, etc. The brand and region aligner/detector 1402 may align the detected brands in time within the content segment based on criteria such timestamps which may indicate when certain advertisements occur in the content item. Also or alternatively, the brand and region aligner/detector 1402 may identify regions in content segments in which to place advertisements based on factors such as having low activity. For example, alignment may indicate that a sports drink brand advertisement occurs from minutes 32 to 33 of a soccer match content item. The segment augmenter 1403 may generate augmented content comprising inserted advertisements for transmission, for example, to the user devices 502A-502D.

Figure 14B:
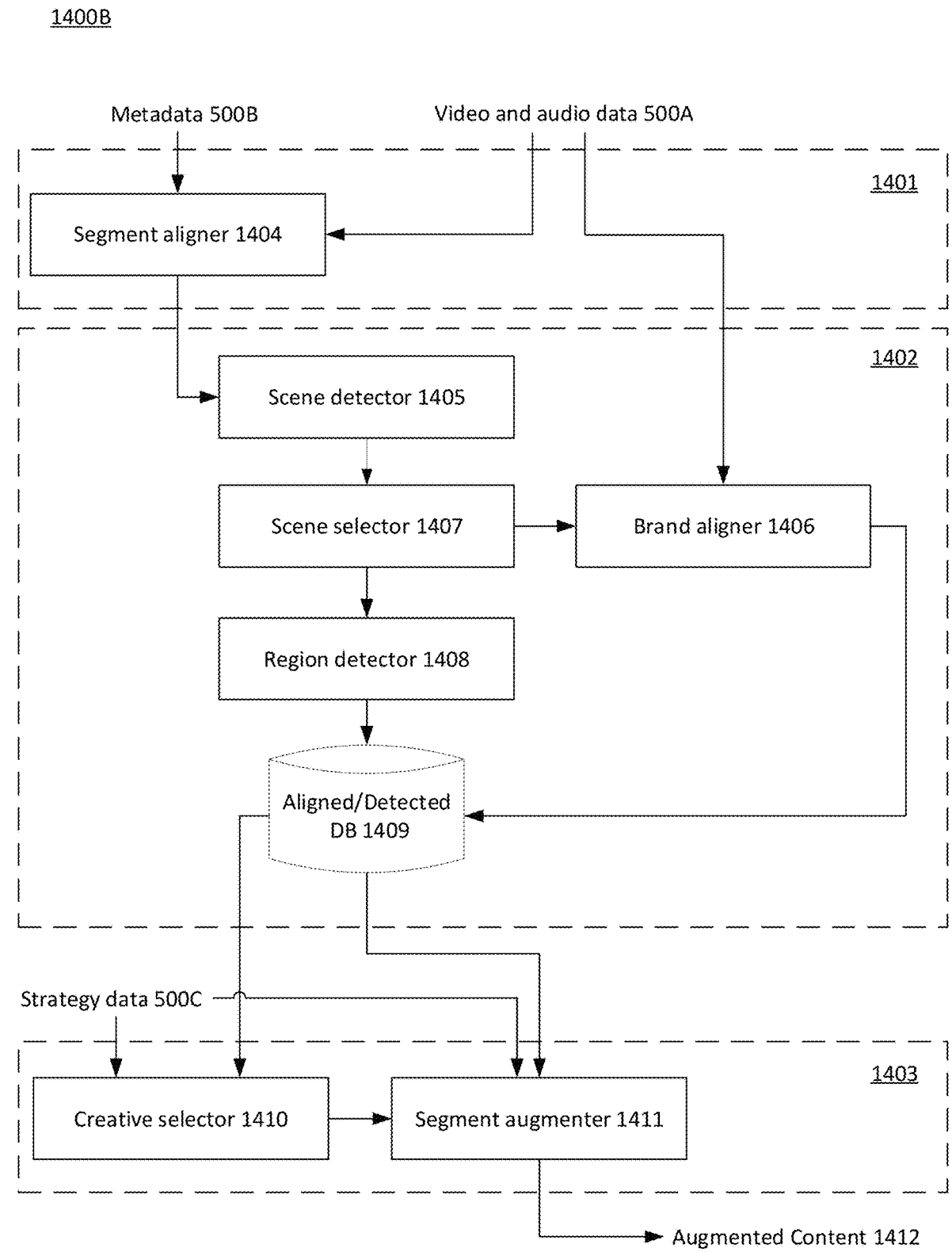

FIG. 14B shows further details of the components 1401-1403 of the augmented video server 122. The segment aligner/detector 1401 may comprise a segment aligner 1404, which may receive video and audio data 500A and/or metadata 500B. The segment aligner 1404 may determine segment types for content segments of a content item received via the video and audio data 500A. Segment types may be determined based on analysis of features in video data and/or audio data, received via the video and audio data 500A, associated with content segments. Also or alternatively, segment types may be determined based on metadata (received via metadata 500B) associated with content segments and/or based on closed captioning (received via the metadata 500B, the video and audio data 500A, and/or via another source).

The segment aligner 1404 may, for example, comprise one or more Media Analytics Framework (MAF) detectors. MAF detectors may identify emotions, energy levels, and/or other characteristics of content based on analysis of facial expressions, tone of voice, use of certain phrases (e.g., expletives), other sounds and/or images, and/or combinations thereof. A MAF detector may be configured to determine segment types of content segments by, for example, configuring the MAF detector to search content for content segments that include characteristics associated with any of a plurality of predefined segment types. The predefined segment types may, for example, comprise segment types that may be associated with emotions and/or other reactions from users that are known to impact the effects of advertising, and/or that may be associated with a particular type of content. MAF detectors may comprise and/or be combined with other detection processes. For example, optical character recognition (OCR) may be used in combination with a MAF detector to search for text in video and/or closed captioning that is indicative of a segment type and/or a brand (e.g., a logo, an existing advertisement in a content segment, etc.). Also or alternatively, a MAF detector may use metadata (e.g., high-quality sport metadata which may comprise information such as timestamps for significant events in the game) to determine characteristics associated with content segments. In the case of time-shifted content, segments may be previously identified (e.g., during a buffer period associated with the time-shift). In the case of live content, segments may be actively aligned/detected via real-time application of MAF detectors and/or other detection features to the live content item. Segments may be identified in live content based external data, for example, social media reactions to events may be monitored and/or analyzed in order to determine whether a segment may have occurred. Additionally, live content may be modified to comprise a brief buffer time (e.g., 5 seconds, 30 seconds, etc.) during which a more limited version of the detection features may be applied to the content.

The brand and region aligner/detector 1402 may comprise a scene detector 1405, a brand aligner 1406, a scene selector 1407, a region detector 1408, and/or an aligned/detected database 1409. The segment aligner 1404 may transmit, to the scene detector 1405, data indicating locations of content segments in a content item and segment types associated with those content segments. The scene detector 1405 may identify the locations of the content segments comprising the identified segment types. The locations may, for example, be indicated in reference to a run time of a content item (e.g., content segment X may begin at time Y and end at time Z). For example, identified scenes may comprise content segments with happy segments such as a player celebrating a scored goal, a crowd cheering for the goal, etc. The scene selector 1407 may retrieve data indicating the locations of the identified scenes from the scene detector 1405 and/or select scenes for augmentation (e.g., scenes that may have certain qualities, such as the player celebrating the scored goal). The scene selector 1407 may transmit content segments (e.g., video data, audio data, and/or metadata associated with selected scenes) to the brand aligner 1406, which may analyze the content to identify brands and locations of brands.

The brand aligner 1406 may comprise systems comprising MAF detectors which may be used to identify brands in a content item. For example, MAF detectors may use computer vision and/or machine-learning algorithms to recognize patterns, in frames of video for a content item, associated with brands, logos, trademarks, service marks, text, colors, and/or other visual indicators or indicia associated with a product, an advertiser, a business, a company, etc. Such machine-learning algorithms may, for example, be trained using images of advertising and/or other materials associated with brands and/or advertisers, and/or using images and/or video from previous content items that include brand displays and/or other advertising. MAF detectors may also or alternatively use optical character recognition (OCR) to detect text in video frames and may compare detected text to one or more databases of text associated with brands, products, advertisers, businesses, companies, etc. Also or alternatively, brands and/or other indicia may be detected based on metadata associated with frames of a content item and/or based on audio data, closed captioning data, and/or other information associated with the content item. If a brand, advertisement, or other indicia associated with a product, an advertiser, a business, a company, etc. is detected in one or more frames of video for a content item, a positions and/or dimensions of the detected indicia may be stored (e.g., as additional metadata and/or as part of one or more data files indexed to those frames) as data specifying frame pixel positions that correspond to the detected indicia. That data may also indicate rotation of the detected indicia relative to image planes associated frames comprising the detected indicia. Positional, dimensional, and/or rotational data for a detected indicia may be used to translate, resize, and/or rotate advertisements and/or other material used to augment the content item (e.g., advertisements and/or other materials that may be used to supplement and/or replace detected indicia).

The region detector 1408 may further analyze the content segments transmitted by the scene selector 1407 to identify regions of interest for augmentation (e.g., less-dynamic regions, low-activity regions, etc.). Also or alternatively, regions of interest may be selected by the region detector 1408 based on viewer engagement. For example, placing advertisements in some regions may result in more user engagement with content than placing them in other regions). User engagement based on regions may be measured by tracking advertisement clicks and/or determining whether users may be more likely interact with an advertisement and/or other content based on its region. An aligned/detected database 1409 may receive region data from the region detector 1408 and/or brand data from the brand aligner 1406. The segment augmenter 1403 may comprise a creative selector 1410 and/or a segment augmenter 1411. The creative selector 1410 may select brands and/or advertisements for segment augmentation based on the strategy data 500C and/or based on data received from the aligned/detected database 1409. The strategy data 500C may indicate various factors to the creative selector 1410. For example, based on an alignment/detection-based strategy, the strategy data 500C may indicate to the creative selector 1410 that an advertisement should be inserted for a brand with an existing advertisement detected in the content segment. The creative selector 1410 may comprise stored advertisements and/or may retrieve advertisements from the content server 106.

The creative selector 1410 may transmit the advertisements to the segment augmenter 1411. The segment augmenter 1411 may receive data from the aligned/detected database 1409 indicating scenes and/or regions for augmentation. For example, the data received from the aligned/detected database 1409 may indicate insertion opportunities at certain times in the content item based on selected scenes and/or in certain locations of the screen based on selected regions. The segment augmenter 1411 may receive the strategy data 500C. The strategy data 500C may comprise selected and/or customized advertisement strategies such as those discussed in connection with FIGS. 10-13). Also or alternatively, the strategy data 500C may be received by the aligned/detected database 1409. Based on the strategy data 500C and the data from the creative selector 1410, the segment augmenter 1411 may generate augmented content 1412, which may comprise content augmented to comprise new and/or changed advertisements based on contextual data and/or advertisement strategies. Also or alternatively, the segment augmenter 1411 may configure a graphical user interface (e.g., the location, appearance, and/or other features of an inserted advertisement). The segment augmenter 1411 may incorporate features (e.g., animations) that suit the context of the segment type. For example, if the scene detector 1405 indicates that a segment of interest is of the exciting type, the segment augmenter 1411 may configure the inserted advertisement to appear with fast and/or electric animations. Similarly, in the case of a segment of the idle type, the segment augmenter 1411 may configure the inserted advertisement to appear with slow animations corresponding to the context of the idle segment.

Figure 15A:
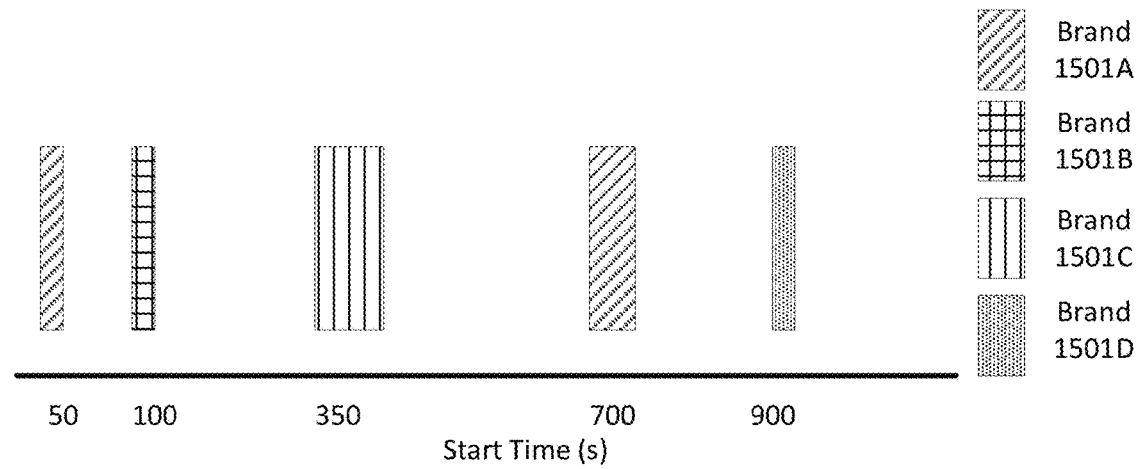
FIG. 15A shows an example graph, which shows a representation of example brands detected throughout a content item.

FIGS. 15A-15E show examples of detected brands and content segments corresponding to various segment types within various content types. FIG. 15A shows an example graph 1501, which shows a representation of example brands detected throughout a content item. Blocks indicating brands 1501A-1501D are plotted on the graph against time in seconds to show the duration of the detected brand's presence in the content item. Multiple brands may be detected within a content item. Brands may be detected one or more times within a content item. One or more brands may be detected at the same time and/or in the same region.

Figure 15B:
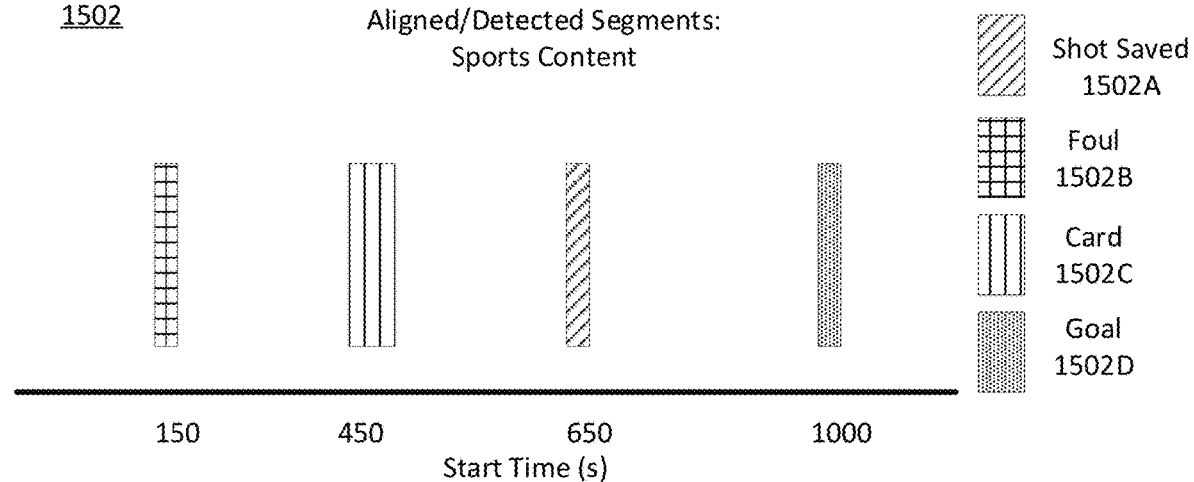
FIGS. 15B, 15C, 15D, and 15E are example graphs for different types of content.
Figure 15C:
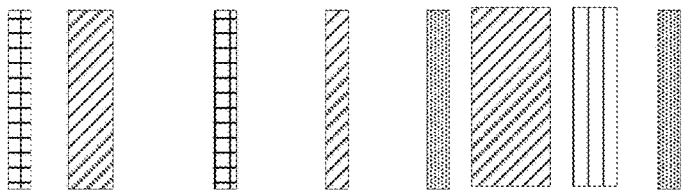
Figure 15D:
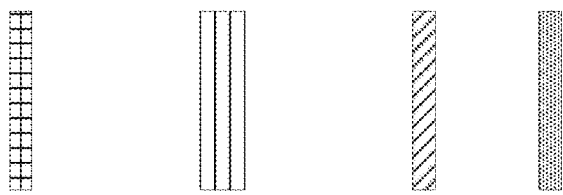

FIGS. 15B-E show examples for different content types (e.g., sports, talking heads, cooking, home improvement, etc.). FIG. 15B shows an example graph 1502, which shows a representation of aligned/detected content segments in sports content (e.g., a soccer match). Example content segments of various segment types may comprise: shot saved 1502A (e.g., exciting segment type), foul 1502B (e.g., negative segment type), card 1502C (e.g., negative segment type), goal 1502D (e.g., exciting and happy segment types), and/or other segments. A given content segment such as the segment 1502D may be of multiple types (e.g., a segment may be both exciting and sad, exciting and happy, exciting and angry, etc.). FIG. 15C shows an example graph 1503, which shows a representation of aligned/detected content segments in talking heads content (e.g., a politically-inclined news show). Example content segments of various segment types may comprise: exciting speech 1503A (e.g., exciting segment type), boring segment 1503B (e.g., boring segment type), negative speech 1503C (e.g., negative segment type), and idle segment 1503D (e.g., idle segment type), and/or other segments. FIG. 15D shows an example graph 1504, which shows a representation of aligned/detected content segments in cooking content (e.g., a competition cooking show). Example content segments of various segments types for cooking content may comprise: recipe discussed 1504A (e.g., idle segment type), food ruined 1504B (e.g., negative segment type), food preparation 1504C (e.g., idle segment type), food plated 1504D (e.g., exciting segment type), and/or other segments.

Figure 15E:
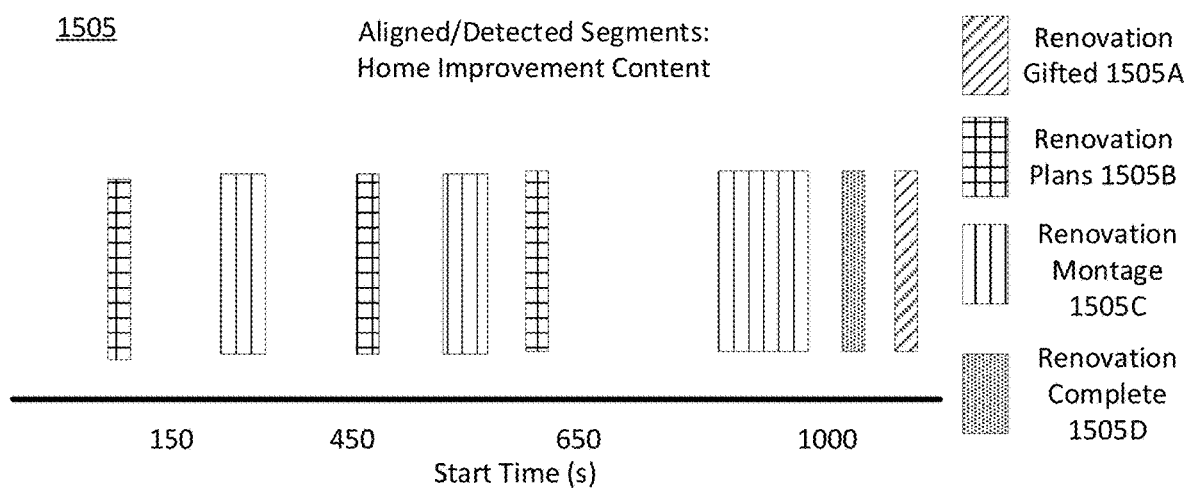

FIG. 15E shows an example graph 1505, which shows a representation of aligned/detected content segments in home improvement content (e.g., a charity renovation show). Example content segments of various segment types for home improvement content may comprise: renovation gifted 1505A (e.g., happy segment type), renovation plans 1505B (e.g., idle segment type), renovation montage 1505C (e.g., idle segment type), renovation complete 1505D (e.g., exciting segment type), and/or other segments. The timestamps indicating the locations of the identified segments within the content items may be stored in metadata associated with the various content items (e.g., in the manifest files). For example, video data, audio data, and/or metadata associated with a charity renovation show content item may be analyzed in order to identify the aligned/detected segments 1505A-1505D. The segments may be identified based on excitement levels, emotions, and/or other factors detected in the content item. For example, the renovation gifted segment 1505A may be aligned/detected as a happy segment based on indicators such as crying, shouts of congratulations, phrases like "thank you", and/or other indicators. Additionally, the renovation montage segment(s) 1505C may be aligned/detected as an idle segment(s) based on indicators such as background music, decreased dialogue, construction sounds, and/or other indicators.

Figure 16A:
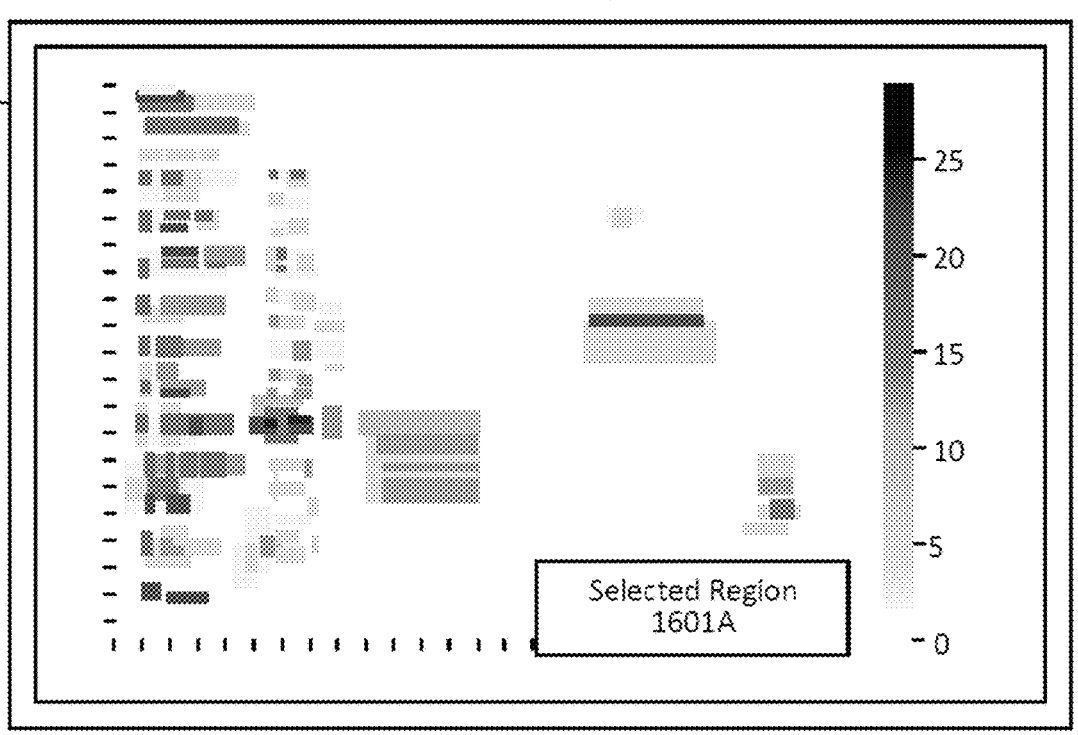
FIGS. 16A and 16B show heatmaps indicating example regions detected for content augmentation.
Figure 16B:
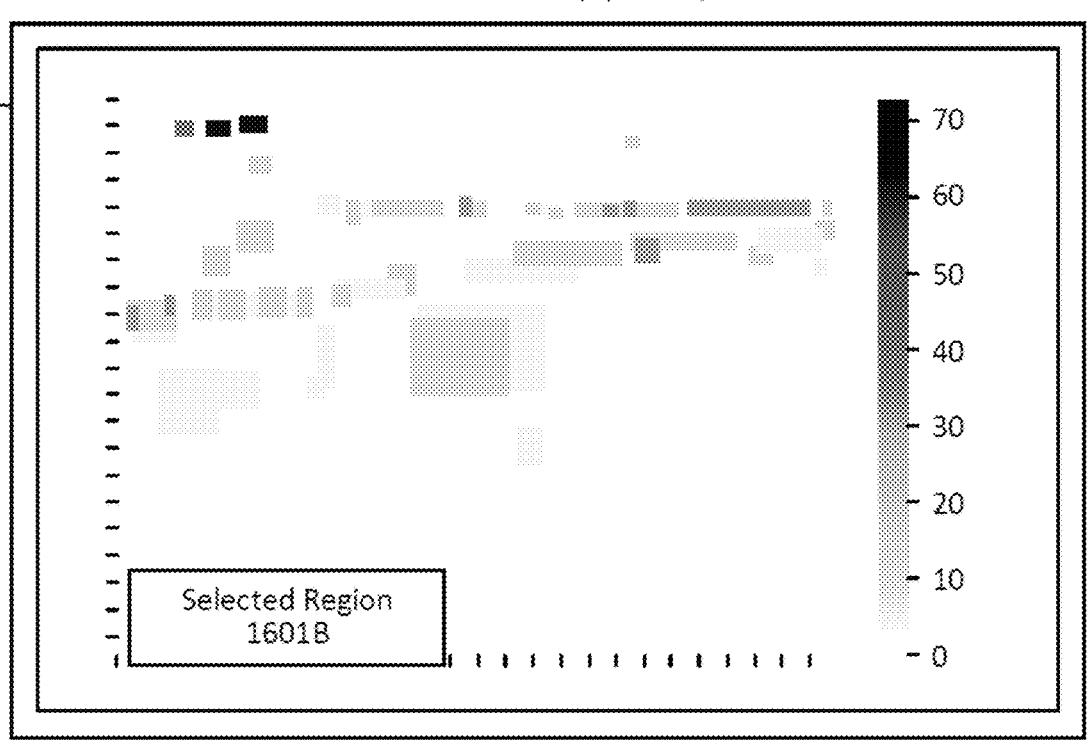

FIGS. 16A-16B show example heatmaps indicating regions detected for content augmentation (e.g., advertisement placement/insertion). Once a content segment may be selected for content augmentation, a region of the screen may be selected (e.g., automatically and/or by an operator) for inserting augmented content such as advertisements. FIG. 16A shows a heatmap 1600A for a content segment of an F1 race content item, and shows selected region 1601A, where the region 1601A may be selected based having the lowest relative heatmap levels. In the heatmap 1600A, lower levels may indicate regions with lower activity (e.g., no text, inserted graphics, perimeter advertisements, etc.). FIG. 16B shows a heatmap 1600B for a content segment of a soccer match content item, and shows selected region 1601B, where the region 1601B shows the least relative activity compared to the rest of the screen. Details associated with the selected regions 1601A-1601B (e.g., region dimensions, duration of low activity in the region, etc.) may be identified and/or transmitted by the region detector 1408 to the aligned/detected database 1409 and/or the segment augmenter 1403.

Figure 17A:
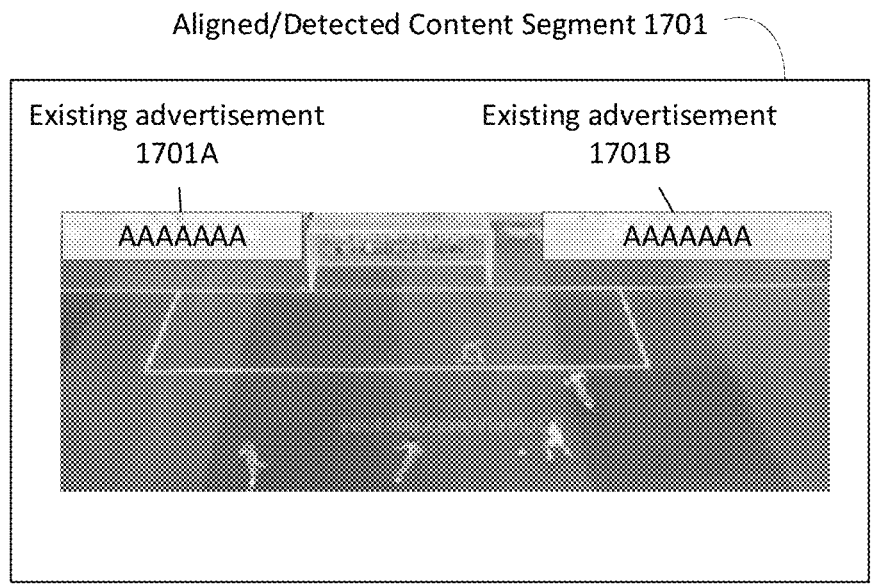
FIG. 17A shows an example brand advertisement detected in a background.
Figure 17B:
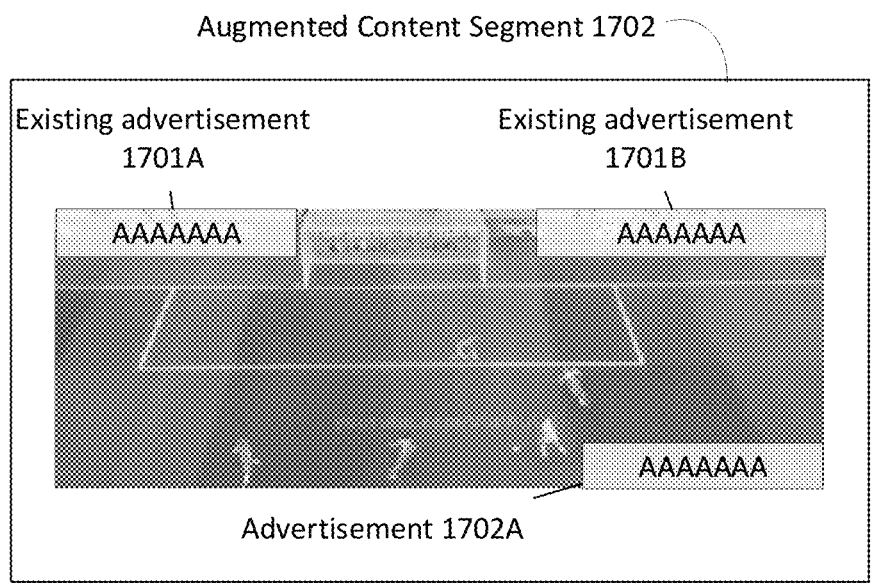
FIG. 17B shows an example advertisement for a detected brand added to a region in a foreground.

FIGS. 17A-17D show examples of a content segment and of augmented content segments generated using the features described herein. The augmented content segments may be generated based on various augmentation features, as described herein. FIG. 17A shows an example aligned/detected content segment 1701 (e.g., of a soccer match) in which existing advertisements 1701A-1701B (e.g., images in the video of sideline boards for brand "AAAAAAA") may be detected. The detected existing advertisements 1701A-1701B may comprise contextual features (e.g., logos, trademarks, and/or other features associated with a brand, advertiser, and/or company). Although advertisements 1701A-1701B may be for the same brand, advertisements for multiple different brands may be detected. Augmented content segment 1702 (FIG. 17B) is a first augmented version of the content segment 1701. An advertisement 1702A based on the detected advertisements 1701A-1701B may be inserted in a foreground region (e.g., in a region identified based on features as described in the examples for FIGS. 16A-16B). Augmented content segment 1703 (FIG. 17C) shows a second augmented version of the content segment 1701. Advertisements 1703A-1703B (e.g., selected based on the detected brand in advertisements 1701A-1701B) may be inserted in place of the advertisements 1701A-1701B.

The advertisements 1703A-1703B may comprise augmented (e.g., highlighted/animated) versions of the advertisements 1701A-1701B, and/or may comprise highlighted/animated advertisement(s) for different brand(s). The advertisements 1703A-1703B may be augmented versions of the existing advertisements 1701A-1701B. For example, the existing advertisements 1701A-1701B may be a static image of a sneaker brand logo, and the augmented advertisements 1703A-1703B may show animated version of the logo. For an exciting content segment, for example, the augmented advertisements 1703A-1703B may show a bouncing version of the logo in bright colors, which may take advantage of increased viewer engagement for the exciting content segment. Also or alternatively, the augmented advertisements 1703A-1703B may be generated based on the existing advertisements 1701A-1701B using other augmentation features. The augmentation features may comprise changing one or more colors of the existing advertisements 1701A-1701B; causing motion in one or more portions of the existing advertisements 1701A-1701B; adding graphics and/or images to the existing advertisements 1701A-1701B; and/or causing blinking, pulsing, and/or other repetitive changes in one or more portions of the existing advertisements 1701A-1701B. The augmentation features may comprise changing the position of the existing advertisements 1701A-1701B (and/or copies of the existing advertisements 1701A-1701B), for example, to a different portion of a video frame. Changing the position of an existing advertisement may comprise causing an advertisement on one side of a screen to be moved and/or replicated on another side of the screen, for example, over a goal as the goal is scored. Augmented content segment 1704 (FIG. 17D) is a third augmented version of the content segment 1701. Advertisements 1701A-1701B B may be replaced by advertisements 1704A-1704B (e.g., selected based on instructions from the venue, team, etc.).

The augmentation features may comprise replacement of at least a portion of the existing advertisements 1701A-1701B with the advertisements 1704A-1704B. Augmentation features may be selected based on the sentiment, event, and/or segment type associated with the content segment selected for augmentation. For example, for a content segment comprising an event predicted to be interesting to a viewer, the augmentation feature of moving the existing advertisements 1701A-1701B (e.g., sideline advertisements) to the side of the screen showing the interesting event. For an exciting content segment, for example, the existing advertisements 1701A-1701B (e.g., a shoe brand logo) may be augmented using the augmentation features of changing colors (e.g., replacing light green with neon green) and causing repetitive changes (e.g., causing the logo to pulse). Similarly, augmentation features may be selected for segments predicted to be boring, idle, and/or uninteresting, which may increase viewer engagement with those segments. Also or alternatively, the augmentation features may be selected based on advertisement strategies, for example, an advertisement strategy may indicate a certain feature (e.g., animating and/or causing pulsing of a static logo) for specific segment types (e.g., exciting content segments). While indicating augmentation features in advertisement strategies based on segment type has been described, any one or more augmentation feature may be similarly indicated based on any number of factors.

Figure 18:
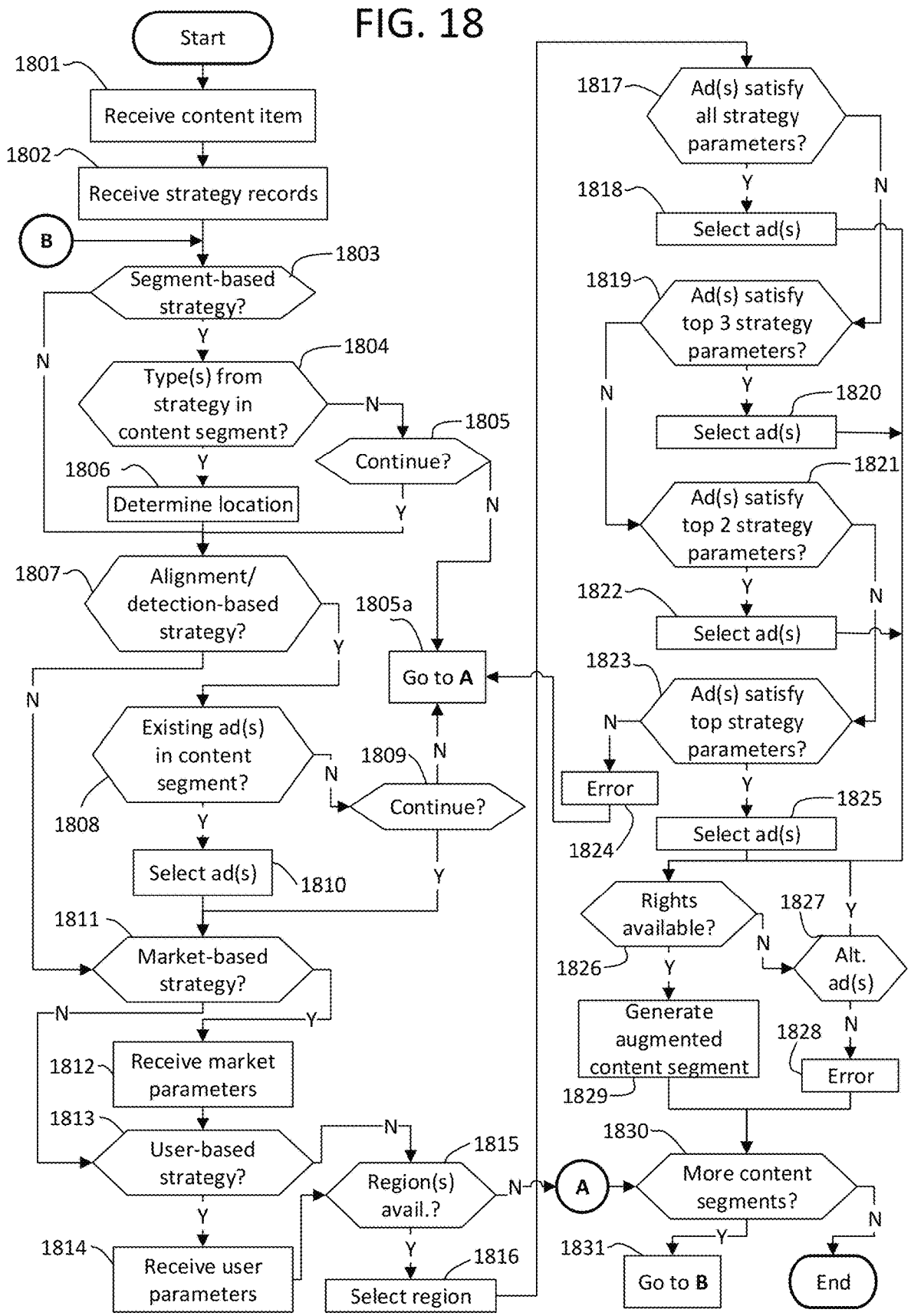
FIG. 18 shows a flow chart for an example method for augmenting content based on one or more advertisement strategies.

FIG. 18 shows a flow chart for an example method of augmenting content based on an advertisement strategy. The advertisement strategy may be entirely segment-based, entirely alignment/detection-based, entirely market-based, or entirely user-based. Alternatively, the advertisement strategy may comprise multiple types of strategies. For example, the advertisement strategy may comprise any combination of segment-based strategy features, alignment/detection-based strategy features, market-based strategy features, and/or user-based strategy features.

The example method shown in FIG. 18 may be performed by any of the devices and/or systems described herein (e.g., the augmented video server 122, the user devices 502A-D, etc.). The example method may be performed by a single computing device, or by a combination of computing devices (e.g., one or more steps and/or portions of steps may be performed by a first computing device, one or more steps and/or portions of steps may be performed by a second computing device, etc.). One or more steps of the example method of FIG. 18 may be rearranged (e.g., performed in a different order), omitted, and/or otherwise modified, and/or other steps may be added. The method of FIG. 18 is described below using an example of augmenting content segments of a content item that comprises video and audio for a soccer match. However, the steps described below may also or alternatively be performed for content associated with other types of sports content (e.g., F1 races, golf, etc.) and/or non-sports content (e.g., cooking shows, home improvement shows, talking heads, etc.).

The augmenting of content segments of a content item may comprise inserting advertisements using standards such as the Society of Cable Telecommunication Engineers standard SCTE-35 for Digital Program Insertion Cueing Message. For example, insertion of advertisements into manifest files associated with the content items may be indicated by SCTE-35 messages. Also or alternatively, using the features described herein, advertisements may be generated and/or augmented in accordance with the Video Ad Serving Template (VAST) standard. For example, advertisements may be inserted in-stream using the VAST standard within the same player outputting a content item. The advertisements described herein may be inserted locally (e.g., at devices in the premises 102) and/or at the headend (e.g., the local office 103).

As shown in FIG. 18, at step 1801, video data, audio data, and/or metadata may be received for the soccer match content item. For example, step 1801 may comprise the augmented video server 122 receiving the audio and video data 500A and the metadata 500B via the content server 106. At step 1802, advertisement strategy records may be received. Advertisement strategy records may comprise information indicating advertisement strategies, which may be segment-based, alignment/detection-based, market-based, user-based, and/or based on other factors. The strategy records may indicate the strategy type (e.g., segment-, alignment/detection-, market-, and/or user-based). Also or alternatively, the strategy records may comprise types of data that may result from selections to configure strategies (as discussed in connection with FIGS. 10-13). As described for the example in FIG. 10, the segment-based strategy may comprise configured parameters such as target brand (e.g., brand for which advertisements may augment the content item), identified segment (e.g., identified in metadata by tags indicating timestamps of the segment location in the content item, etc.), and/or other parameters. For example, a segment-based advertisement strategy may indicate that advertisements for a specified brand (e.g., an energy drink brand) should be placed at idle segments in a soccer match content item. Strategy records corresponding to one or more advertisement strategies may be simultaneously received.

At step 1803, a determination may be made as to whether the strategy associated with the received strategy records is, in whole or in part, segment-based. If the strategy is not segment-based, step 1807 may be performed. If the strategy is segment-based (or includes segment-based strategy features), at step 1804 a determination may be made as to whether one or more segment types indicated by the strategy may be present in the soccer match content item. For example, the strategy may indicate that augmentation should occur for idle segments in the content item. If the content segment includes the indicated segment types, at step 1806 their locations within the content segments may be identified. After step 1806, step 1807 may be performed.

If the content item does not include the indicated segment types, at step 1805, a determination may be made as to whether the process should continue. For example, strategy records may indicate that, if the specified segment type(s) may not be present, then the determination at step 1805 may indicate that no augmentation should be performed. Alternatively, strategy records may indicate that, even if none of the specified segment types may be present, augmentation may be performed based on one or more other criteria based on strategy records (e.g., alignment/detection-based criteria, market-based criteria, user-based criteria, etc.). If it is determined that the process should not continue, then step 1805*a* may comprise instructions to perform step 1830 (indicated in FIG. 18 by label "A"). Step 1830 is described below. If at step 1805, it is determined that the process should continue, at step 1807 a determination may be made as to whether the strategy associated with the received strategy records is, in whole or in part, alignment/detection-based.

If the strategy is alignment/detection-based (or includes alignment/detection-based strategy features), at step 1808 a determination may be made as to whether the content segments within the content item comprise existing advertisements. If existing advertisements are detected in the content segments, at step 1810 one or more of the existing advertisements may be selected for which augmentation may be performed. For example, an alignment/detection-based advertisement strategy may indicate that advertisements for one or more detected brands should be placed at idle segments in the soccer match content item. As described above for FIGS. 14A-B, the existing advertisements may be aligned/detected via OCR and/or other detection features applied to the content item. Segments (e.g., idle segments) may be identified via MAF detectors and/or other detection processes. In the example of soccer match content, for example, brands appearing on player jerseys, sideline boards, perimeter ads, etc. may be aligned/detected. Idle segments may be identified based on indications in metadata in combination with other indicators as identified by the MAF detectors. Additional or alternative idle segments than those flagged in the metadata may be identified, for example, technical difficulties resulting in lowered stream quality may be identified as idle for a time period by the MAF detectors. After step 1810, step 1811 may be performed.

If it is determined at step 1808 that the content segment does not comprise existing advertisements, at step 1809 a determination may be made as to whether the process should continue. If it is determined that the process should not continue, steps 1805a and 1830 may be performed. If it is determined that the process should continue, step 1811 may be performed.

At step 1811, a determination may be made as to whether the strategy associated with the received strategy records is, in whole or in part, market-based. If the strategy is market-based (or includes market-based strategy features), at step 1812 market parameters may be received. Market parameters may comprise data indicating the markets for which the augmented content may be generated and/or output. For example, market parameters may indicate geographic/location-based markets, demographic-based markets, fanbase-based markets, and/or other market categories. For example, a market-based advertisement strategy may indicate that advertisements for one or more markets should be placed at idle segments in the soccer match content item. A geographic market such as the greater Philadelphia area may be selected for the market-based strategy. For example, during an idle segment in a soccer match, the market-based strategy may suggest and/or select an advertisement for a local restaurant to be placed in a low-activity region of the screen. In the case of a geographic market-based strategy, the local time may and/or other location-specific information (e.g., weather, current events, etc.) may be considered when determining the type of advertisement to place. For example, if the soccer match is being transmitted during around midday in the greater Philadelphia area, the local restaurant's lunch menu may be highlighted during by the augmentation of the content item.

After step 1812, or after a "no" determination in step 1811, step 1813 may be performed. At step 1813, a determination may be made as to whether the strategy associated with the received strategy records is, in whole or in part, a user-based strategy. If the strategy is user-based (or includes user-based strategy features), at step 1814 user parameters may be received. User parameters may comprise types of data shown in FIG. 9C, such as personal information (e.g., gender, age, relationship status, number of children, etc.), location information, financial information (e.g., income level, spending habits, etc.), brand preferences, purchasing history, and/or other information. Based on a user-based strategy, the content item may be augmented to include advertisements for businesses from which the user has previously purchased products. For example, a user-based advertisement strategy may indicate that advertisements for one or more users, households, and/or groups of users should be placed at idle segments in the content for which the method of FIG. 18 is being performed (e.g., the soccer match content item). An individual user may be selected for the user-based strategy. In addition to selected and/or aligned/detected brands, user-based strategies may suggest advertisements specific to the selected user for augmenting the content item. For example, during an idle segment in the soccer match, the user-based strategy may suggest and/or select advertisements for brands with which the user has a documented purchase history, brands which may be similar to others preferred by the user, brands which may be targeted to one or more of the user's demographic categories, and/or others. For example, of multiple brands aligned/detected in the content item, the user-based strategy may suggest and/or select advertisements for a restaurant chain and a cologne brand which the user is known to prefer. Users may be more likely to engage with advertisements from brands they already prefer and/or brands which are targeted towards their preferences, which may result in increased revenue for those brands.

Figure 17C:
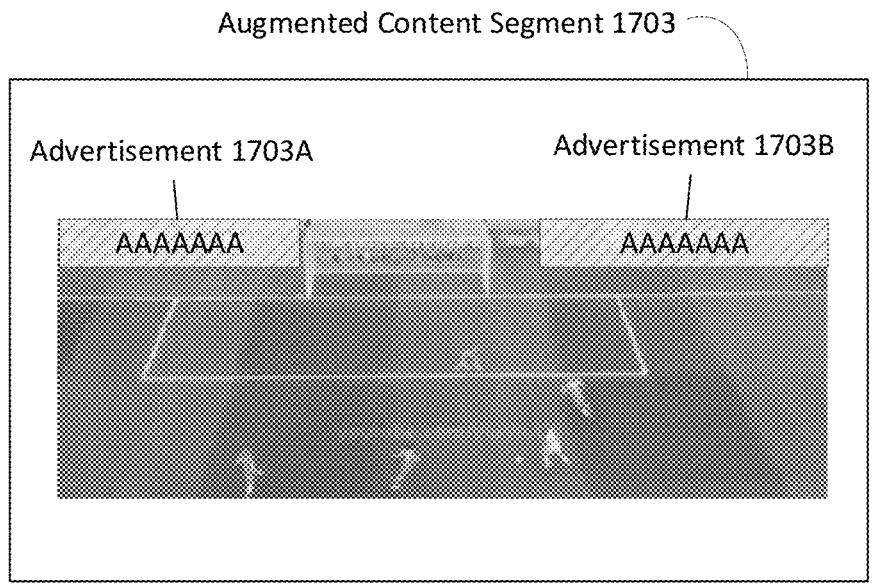
FIG. 17C shows an example advertisement for a detected brand highlighted and/or animated.
Figure 17D:
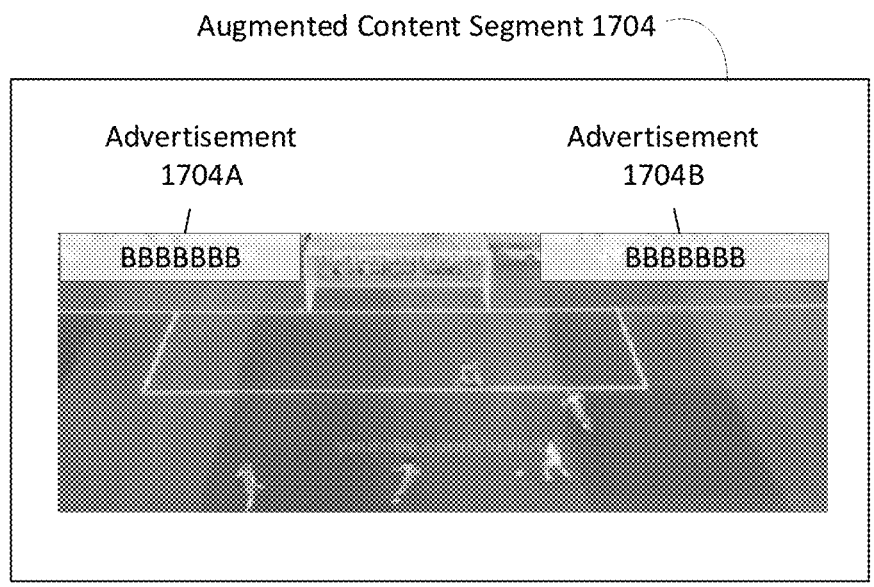
FIG. 17D shows an example advertisement for a detected brand replaced by another advertisement.

After step 1814, or after a "No" determination in step 1813, step 1815 may be performed. At step 1815 a determination may be made as to whether one or more regions of video within the content segment may be available for insertion of advertisements. If no regions are available, step 1830 may be performed. For example, no regions may be available if there are no detected advertisements for augmentation or replacement (as shown in FIGS. 17C-17D, which comprise augmented and replaced advertisements, respectively). Also or alternatively, no regions may be available if there are no idle regions and/or regions with activity below a certain threshold. If there are regions available, at step 1816, one or more regions may be selected for augmentation. Regions may be selected if they comprise regions of low activity, comprise content which may be determined to be uninteresting to viewers, and/or if they are otherwise convenient. Augmentation may comprise replacing an existing advertisement with altered versions of the same advertisement or with other advertisements. Replacing existing advertisements may comprise placing the augmented advertisement in the same region as the existing advertisement. The advertisement strategies may comprise information indicating whether the augmented advertisements should be placed in place of existing advertisements or in other regions.

At step 1817, a determination may be made as to whether an advertisement satisfies all of the parameter categories of the received advertisement strategy. More than one advertisement may satisfy the strategy parameter categories. An inventory of advertisements may be comprised in the content server 106, the augmented video server 122, and/or in other locations. The strategy parameter categories may comprise segment-based parameters (e.g., indications of advertisement content to select based on segment type(s) indicated by segment-based features of the strategy associated with the records received in step 1802), alignment/detection-based parameters (e.g., indications of advertisement content to select based on existing ads indicated by alignment/detection-based features of the strategy), market-based parameters (e.g., indications of advertisement content to select based on market parameters indicated by market-based features of the strategy), and/or user-based parameters corresponding (e.g., indications of advertisement content to select based on user parameters indicated by user-based features of the strategy). Because an advertisement strategy may comprise parameters from multiple advertisement strategy types, step 1817 comprises determining whether all parameter categories in the received advertisement strategy may be satisfied by an advertisement. If an advertisement is found to satisfy all of the strategy parameter categories, then at step 1818, that advertisement may be selected. The advertisement strategy may indicate that more than one advertisement should be selected, and in that case, the one or more relevant advertisements may be selected. For example, if there are multiple advertisements that satisfy all parameter categories, one or more of the multiple advertisements may be selected and/or flagged. After step 1818, step 1826 may be performed.

If no advertisements were found at step 1817 to satisfy all of the strategy parameter categories, at step 1819 a determination is made as to whether any advertisements may be found to satisfy the top three strategy parameter categories. Priority of strategy parameter categories may be defined by the strategy records received at step 1802 and/or based on operator input and/or selection during configuration of the advertisement strategy. If an advertisement is found to satisfy the top three strategy parameter categories, at step 1820 the advertisement may be selected. If there are multiple advertisements that satisfy the top three parameter categories, one or more of the multiple advertisements may be selected and/or flagged. After step 1820, step 1826 may be performed. If no advertisements were found at step 1819 to satisfy the top three strategy parameter categories, at step 1821, a determination may be made as to whether any advertisements may be found to satisfy the top two strategy parameter categories. If an advertisement is found to satisfy the top two strategy parameter categories, at step 1822, the advertisement is selected. If there are multiple advertisements that satisfy the top two parameter categories, one or more of the multiple advertisements may be selected and/or flagged. After step 1822, step 1826 may be performed. If no advertisements were found at step 1821 to satisfy the top two strategy parameter categories, at step 1823 a determination is made as to whether any advertisements may be found to satisfy the top strategy parameter category. If no advertisement is found to satisfy the top strategy parameter category, at step 1824 an error may be indicated and steps 1805a and 1820 may be performed. If an advertisement is found to satisfy the top strategy parameter category, at step 1825 the advertisement may be selected. If there are multiple advertisements that satisfy the top parameter categories, one or more of the multiple advertisements may be selected and/or flagged.

At step 1826, a determination may be made as to whether rights are available for various parameters and/or for the selected advertisement(s). For example, if multiple advertisements were selected in step 1818, step 1820, step 1822, or step 1825, those multiple advertisements may be chosen for step 1826. Rights data (e.g., licensing information, etc.) may be available for the selected advertisement, for the target brand, and/or for other parameters. Rights data may indicate advertising partnerships (e.g., if a certain brand is associated with a venue, team, organization, etc.), licensing agreements (e.g., between brands, venues, networks, content delivery platforms, and/or other parties), and/or other information which may be used in determining whether an advertisement may be placed and/or modified in a certain content item. If the rights are not available, at step 1827 a determination may be made as to whether alternate advertisements may satisfy the strategy parameter categories. For example, if multiple advertisements were selected in step 1818, step 1820, step 1822, or step 1825, an alternate advertisement may be available. If an alternate advertisement is available, step 1826 may be repeated to determine whether rights are available for the alternate advertisement. If no alternate advertisement is available, then at step 1828, an error may be indicated.

If rights are determined in step 1826 to be available, at step 1829 an augmented content segment may be generated. For example, the content segment may be augmented to insert an animated advertisement for an energy drink brand over an existing advertisement (e.g., the energy drink brand's logo may have been identified on a sideline board in the venue) during idle segments in the match such as substitutions and team setups. At step 1830, a determination is made as to whether there are more content segments associated with the content item for which the method of FIG. 18 may be performed. If there are more content segments, step 1803 may be repeated (as indicated by step 1831 and label B). If there are not more content segments the process may end.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:
1. A method comprising:
   detecting, by a computing device, one or more advertisements in one or more first video regions of one or more segments of a content item;
   selecting, based on a user interest level corresponding to the one or more segments of the content item satisfying a threshold, and based on an activity level of one or more second video regions, the one or more second video regions adjacent to the one or more first video regions; and
   augmenting the one or more advertisements in the one or more first video regions by:
      replacing the one or more advertisements in the one or more first video regions with a first portion of one or more second advertisements; and
      causing a second portion of the one or more second advertisements to output in the one or more second video regions.
2. The method of claim 1, further comprising:
   generating the first portion of the one or more second advertisements by adding, to the one or more advertisements, one or more of:
   animation of at least a portion of the one or more advertisements;
   one or more changes to one or more colors of the one or more advertisements;
   one or more changes to location of the one or more advertisements;
   one or more size changes of one or more portions of the one or more advertisements;

addition of graphics and/or images to the one or more second video regions of the one or more advertisements; or one or more changes to text of the one or more advertisements.

3. The method of claim 1, wherein the user interest level corresponding to the one or more segments of the content item is based on determining that the one or more segments of the content item comprise one or more of:
an activity predicted to be uninteresting to viewers of the content item,
an activity predicted to be interesting to viewers of the content item, or
an activity predicted to be exciting to viewers of the content item.

4. The method of claim 1, wherein the detecting the one or more advertisements comprises:
monitoring the one or more first video regions of the one or more segments of the content item for the one or more advertisements.

5. The method of claim 1, further comprising:
identifying the one or more second advertisements based on a segment type of the one or more segments.

6. The method of claim 1, further comprising:
generating the one or more second advertisements based on one or more of:
geographic information; or
viewer demographic information.

7. The method of claim 1, wherein the selecting the one or more second video regions is further based on one or more of:
metadata corresponding to one or more segment types of the one or more segments;
closed captioning data associated with the one or more segments; or
audio associated with the one or more segments.

8. The method of claim 1, wherein the selecting the one or more second video regions is further based on determining an availability of rights associated with the one or more advertisements.

9. The method of claim 1, wherein the one or more advertisements comprise a brand logo on a subject in the content item.

10. The method of claim 1, wherein the one or more advertisements correspond to a subject of the content item.

11. The method of claim 1, further comprising:
determining the activity level of the one or more second video regions based on one or more of:
metadata associated with the one or more segments;
closed captioning associated with the one or more segments;
Media Analytics Framework (MAF) detection of the one or more segments; or
optical character recognition (OCR) associated with the one or more segments.

12. The method of claim 1, wherein the
selecting the one or more second video regions is based on determining, using a heatmap corresponding to the one or more segments of the content item, that the one or more second video regions comprise a low heatmap level compared to other video regions of the one or more segments of the content item.

13. A non-transitory computer-readable medium storing instructions that, when executed, cause:
detecting one or more advertisements in one or more first video regions of one or more segments of a content item;

selecting, based on a user interest level corresponding to the one or more segments of the content item satisfying a threshold, and based on an activity level of one or more second video regions, the one or more second video regions adjacent to the one or more first video regions; and
augmenting the one or more advertisements in the one or more first video regions by:
replacing the one or more advertisements in the one or more first video regions with a first portion of one or more second advertisements; and
causing a second portion of the one or more second advertisements to output in the one or more second video regions.

14. The non-transitory computer-readable medium of claim 13, wherein the instructions, when executed, cause:
generating the first portion of the one or more second advertisements by adding, to the one or more advertisements, one or more of:
animation of at least a portion of the one or more advertisements;
one or more changes to one or more colors of the one or more advertisements;
one or more changes to location of the one or more advertisements;
one or more size changes of one or more portions of the one or more advertisements;
addition of graphics and/or images to the one or more second video regions of the one or more advertisements; or
one or more changes to text of the one or more advertisements.

15. The non-transitory computer-readable medium of claim 13, wherein the user interest level corresponding to the one or more segments of the content item is based on determining that the one or more segments of the content item comprise one or more of:
an activity predicted to be uninteresting to viewers of the content item,
an activity predicted to be interesting to viewers of the content item, or
an activity predicted to be exciting to viewers of the content item.

16. The non-transitory computer-readable medium of claim 13, wherein the instructions, when executed, further cause:
identifying the one or more second advertisements based on a segment type of the one or more segments.

17. The non-transitory computer-readable medium of claim 13, wherein the instructions, when executed, further cause:
generating the one or more second advertisements based on:
geographic information; or
viewer demographic information.

18. The non-transitory computer-readable medium of claim 13, wherein the instructions, when executed, further cause the selecting the one or more second video regions based on one or more of:
metadata corresponding to one or more segment types of the one or more segments;
closed captioning data associated with the one or more segments; or
audio of the one or more segments.

19. An apparatus comprising:
one or more processors; and
memory storing instructions that, when executed by the one or more processors, cause the apparatus to:
  detect one or more advertisements in one or more first video regions of one or more segments of a content item;
  select, based on a user interest level corresponding to the one or more segments of the content item satisfying a threshold, and based on an activity level of one or more second video regions, the one or more second video regions adjacent to the one or more first video regions; and
  augment the one or more advertisements in the one or more first video regions by:
    replacing the one or more advertisements in the one or more first video regions with a first portion of one or more second advertisements; and
    causing a second portion of the one or more second advertisements to output in the one or more second video regions.

20. The apparatus of claim 19, wherein the instructions, when executed by the one or more processors, further cause the apparatus to:
  generate the first portion of the one or more second advertisements by adding, to the one or more advertisements, one or more of:
    animation of at least a portion of the one or more advertisements;
    one or more changes to one or more colors of the one or more advertisements;
    one or more changes to location of the one or more advertisements;
    one or more size changes of one or more portions of the one or more advertisements;
    addition of graphics and/or images to the one or more first video regions of the one or more advertisements; or
    one or more changes to text of the one or more advertisements.

21. The apparatus of claim 19, wherein the user interest level corresponding to the one or more segments of the content item is based on determining that the one or more segments of the content item comprise one or more of:
  an activity predicted to be uninteresting to viewers of the content item,
  an activity predicted to be interesting to viewers of the content item, or
  an activity predicted to be exciting to viewers of the content item.

22. The apparatus of claim 19, wherein the instructions, when executed by the one or more processors, further cause the apparatus to:
  identify the one or more second advertisements based on a segment type of the one or more segments.

23. The apparatus of claim 19, wherein the instructions, when executed by the one or more processors, further cause the apparatus to:
  generate the one or more second advertisements based on:
    geographic information; or
    viewer demographic information.

24. The apparatus of claim 19, wherein the instructions, when executed by the one or more processors, cause the apparatus to select the one or more second video regions further based on one or more of:
  metadata corresponding to one or more segment types of the one or more segments;
  closed captioning data associated with the one or more segments; or
  audio associated with the one or more segments.

* * * * *